US009015592B2

(12) United States Patent
Gandhi et al.

(10) Patent No.: US 9,015,592 B2
(45) Date of Patent: Apr. 21, 2015

(54) METHOD, APPARATUS, AND COMPUTER PROGRAM FOR PROVIDING WEB SERVICE TESTING

(75) Inventors: Amish Gandhi, New York, NY (US);
Valeriy Elbert, Madison, NJ (US); Paul Perry, Lexington, MA (US); Gregory Wang, Brighton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1731 days.

(21) Appl. No.: 12/048,504

(22) Filed: Mar. 14, 2008

(65) Prior Publication Data

US 2009/0235172 A1      Sep. 17, 2009

(51) Int. Cl.
*G06F 3/00* (2006.01)
*G06F 11/36* (2006.01)
*H04L 12/26* (2006.01)
*H04L 12/24* (2006.01)

(52) U.S. Cl.
CPC ........ *G06F 11/3696* (2013.01); *G06F 11/3688* (2013.01); *H04L 12/2697* (2013.01); *H04L 41/22* (2013.01); *H04L 43/50* (2013.01)

(58) Field of Classification Search
CPC ............ G06F 11/3466; G06F 11/3636; G06F 11/3604
USPC .......................................................... 715/733
See application file for complete search history.

(56) References Cited

U.S. PATENT DOCUMENTS

| | | | | |
|---|---|---|---|---|
| 7,096,385 | B1* | 8/2006 | Fant et al. ........................ | 714/30 |
| 7,493,521 | B1* | 2/2009 | Li et al. .......................... | 717/124 |
| 2004/0128651 | A1* | 7/2004 | Lau ................................. | 717/124 |
| 2004/0153774 | A1* | 8/2004 | Gavish et al. ................... | 714/25 |
| 2005/0234680 | A1* | 10/2005 | Dettinger et al. .............. | 702/182 |
| 2007/0136024 | A1* | 6/2007 | Moser et al. ................... | 702/119 |
| 2008/0228861 | A1* | 9/2008 | Tadauchi et al. .............. | 709/203 |
| 2009/0177567 | A1* | 7/2009 | McKerlich et al. ............. | 705/35 |
| 2009/0204945 | A1* | 8/2009 | Jain et al. ....................... | 717/124 |
| 2009/0217097 | A1* | 8/2009 | Laperi et al. ................... | 714/37 |
| 2011/0163967 | A1* | 7/2011 | Chaudhri ....................... | 345/173 |
| 2012/0331059 | A1* | 12/2012 | Luna ............................. | 709/204 |
| 2014/0032722 | A1* | 1/2014 | Snow ............................ | 709/220 |

* cited by examiner

*Primary Examiner* — Amy Ng
*Assistant Examiner* — Andres E Gutierrez

(57) ABSTRACT

A method, apparatus, and a computer program product for providing web service testing are provided. The apparatus may include a processor that is configured to provide a user interface for a testing tool accessible in a distributed network architecture. The processor may also be configured to receive selections of an application(s) to be tested that is accessible in a distributed network architecture, a function(s) that is associated with the selected application and a method(s) that is associated with the selected function(s). Additionally, the processor may be configured to receive selections of a test case(s) that is associated with the selected method(s). Moreover, the processor may be configured to automatically conduct the selected test case(s).

20 Claims, 26 Drawing Sheets

Run: [Selected Cases] [Smoke Test] [Regression Test]

TestCase 'default' has been successfully updated.

1900

[New Test Case]

API: LnpCancelOrder

| Test Case | Status | Action | SmokeTest | Regression | Description | Modified |
|---|---|---|---|---|---|---|
| default | Retired | Activate Delete | | | | MM/DD/YYYY |

METHOD, APPARATUS, AND COMPUTER PROGRAM FOR PROVIDING WEB SERVICE TESTING

BACKGROUND OF THE INVENTION

With the advent of the Internet, there has been a proliferation of web based applications. Each application can have one or more different functions or services. When integrating one or more of these applications, one way for the applications to communicate is through the use of web services. This integration and communication may be accomplished by means of XML, Simple Object Access Protocol ("SOAP"), Web Services Description Language ("WSDL") and Universal Description, Discovery and Integration ("UDDI") open standards over an Internet protocol. Web services may be used not only over the Internet but also within a corporation's intranet.

The development of software generally includes several stages. One essential stage in software development, including web based applications, is effective testing because the proper functionality of the software is key to the satisfaction of the end user. Accordingly, it is useful to have a tool that can provide efficient testing of the web service.

There are currently several tools available that provide the testing of web services. However, these available testing tools generally suffer from several challenges. First, some of the existing testing platforms are not sufficiently flexible in that they may not support the myriad of variations to which web services can be subjected and they may not support some advanced usability features. Second, some of the available testing tools may not support the automation of testing. Third, some of the existing testing platforms may not allow the testing to take place from a centralized location. Instead, the current testing tools are client based and accordingly typically require a download onto the user's system which, in turn, may require the usage of considerable memory space and are Operating System specific. In this regard, there is therefore a need for an improved web testing tool that can address at least some of these challenges in the area of web service testing.

BRIEF DESCRIPTION OF THE SEVERAL VIEWS OF THE DRAWING(S)

FIG. 19 illustrates an exemplary screen shot of a graphical user interface showing yet another administrative functionality applicable to a selected test case according to one embodiment.

FIG. 23 illustrates an exemplary screen shot of a graphical user interface for assigning a priority level to a selected test case according to one embodiment.

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

One or more embodiments may be implemented as a method(s), a system(s), a device(s), or a computer program product(s). Accordingly, an embodiment may take the form of an entirely hardware embodiment, an entirely software embodiment, or an embodiment combining software and hardware aspects. Furthermore, implementations of an embodiment may take the form of a computer program product including a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

A graphical user interface (GUI) may be generated in accordance with one embodiment in order to provide input to and output from the testing tool. According to one embodiment of the present invention, the GUI is generated by the execution of a browser. One browser can be opened to conduct the testing of the web services, consistent with one embodiment. According to another embodiment, however, multiple browsers can be opened at the same time and testing can be conducted via all of the browsers in parallel or in sequence. The browser can be one of the many available web browsers such as, but not limited to, Internet Explorer, Mozilla Firefox, and Safari. In embodiments in which multiple browsers are utilized, the multiple browsers can all be a single type of browser or can be an assortment of different browsers. Regardless, a method in accordance with one embodiment will be hereinafter described in conjunction with a series of displays presented by a GUI. However, other embodiments are provided by the apparatus, such as the ones described in the following paragraphs.

Figure 1:
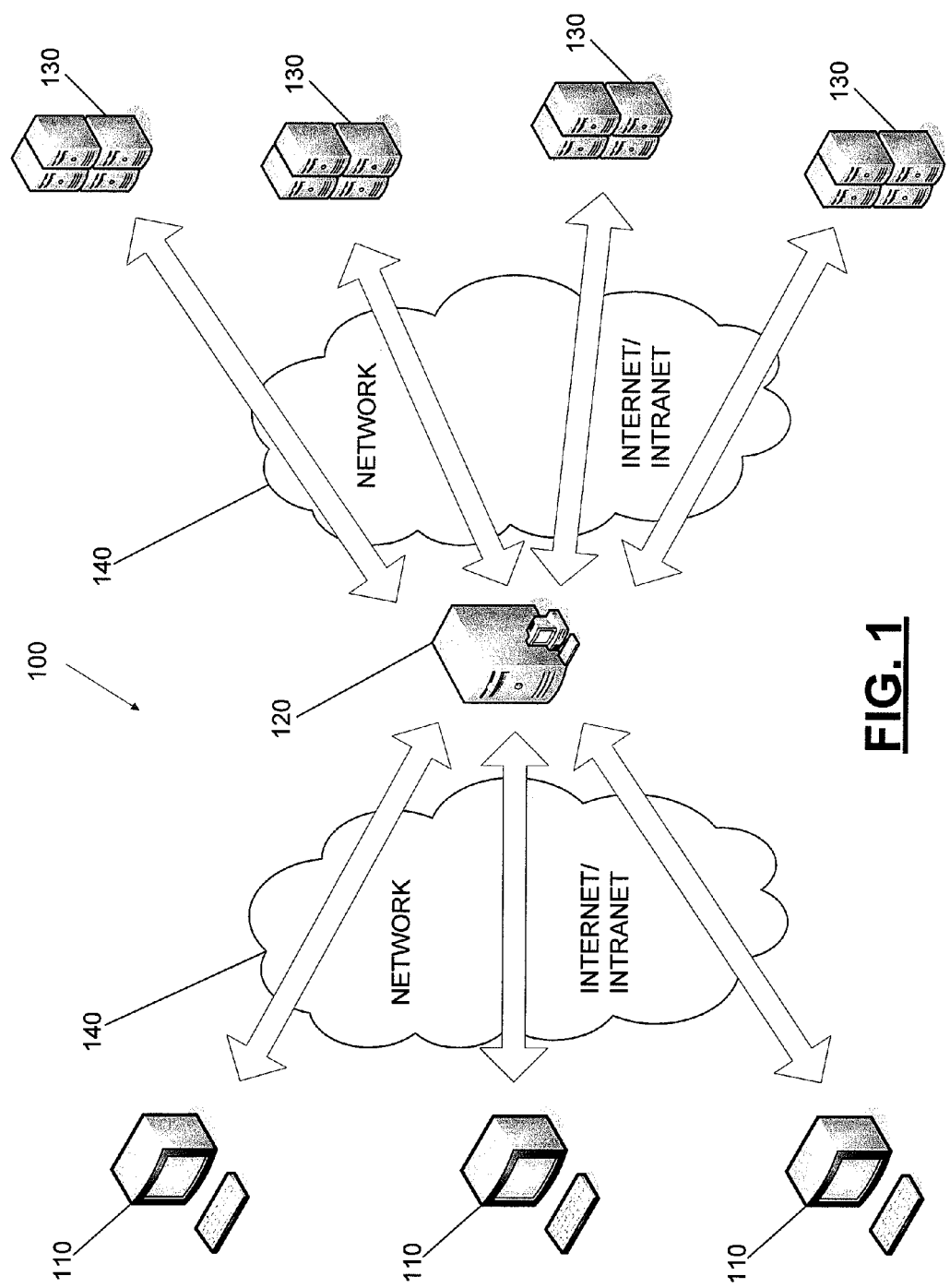
FIG. 1 illustrates an exemplary system for testing web services according to one embodiment.

FIG. 1 illustrates an exemplary system 100 wherein the testing of web services 130 occurs according to and consistent with one embodiment. As shown, the web services testing tool 120 resides in a distributed network architecture 140. The web services testing tool 120 may be embodied by an apparatus, such as a computing device, e.g., a server, having a processor for performing the various operations of the test methodology described hereinbelow. In one embodiment, the web services testing tool 120 executes a computer program product that includes computer program instructions, e.g., software, stored in a computer readable medium, e.g., memory, for performing the various operations of the test methodology described hereinbelow. The network 140 can be the Internet, the intranet or any other network. Various user machines 110 can be connected to the network to access the testing tool through the network, in accordance with one embodiment. The user machines 110 can be any of a variety of computing devices including desktop computers, laptop computers, portable digital assistants (PDAs), or the like. As further shown, there are a plurality of web services 130 accessible over the network, each providing different types of services, consistent with one embodiment.

The central location of the testing tool through its remote residence in a distributed network architecture, as shown in FIG. 1, is advantageous for at least the following reasons. First, the centralization of the testing tool enables it to be a shared application utilized by one or more different users. Accordingly, several users can access and share the testing tool at the same time to perform testing without any inconvenience to any of the users. Second, the central location of the tool eliminates the requirement for a download of the testing tool onto the user's machine. Therefore, a user can maintain and save the memory space on the machine used to conduct the testing for other applications. As such, any device that has connectability to a network, whether Internet or intranet or otherwise, can access the testing tool and conduct testing of desired web services. For example, a user who possesses a PDA with low memory capacity can connect to a network in which the testing tool resides and effectively conduct the testing of various desired web services, in accordance with one embodiment.

Figure 2:
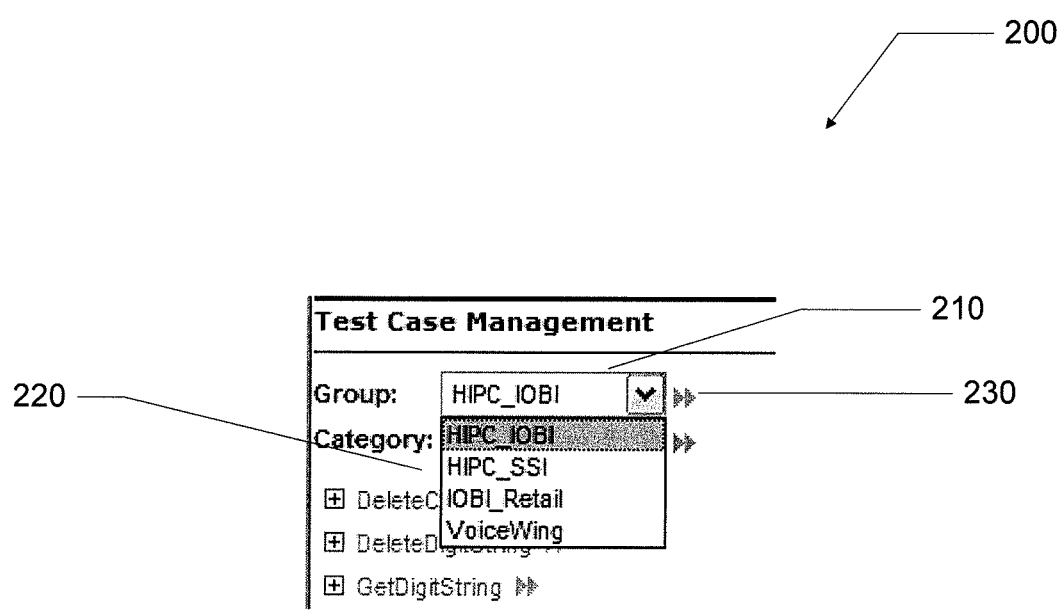
FIG. 2 illustrates an exemplary screen shot of a graphical user interface showing a selection of groups to be tested according to one embodiment.

In FIG. 2, an exemplary screen shot 200 of a GUI generated by a browser launched by one or more of the user machines 110 for providing access to the web services testing tool 120 shows one or more groups 220 to be tested, consistent with one embodiment. According to one embodiment, the one or more groups can be in the form of a list. The list of groups 220 can be accessed through Group drop down menu 210. Each project or application, such as VoiceWing, whose associated web services are to be tested by the testing tool, is designated as a group. The list of groups 220 displays all the current projects available to be tested by the testing tool, according to one embodiment. Double arrows 230 provide a means for accessing the attributes of the selected group in greater detail to perform administrative functions, as will be shown in FIG. 3 below.

Figure 3:
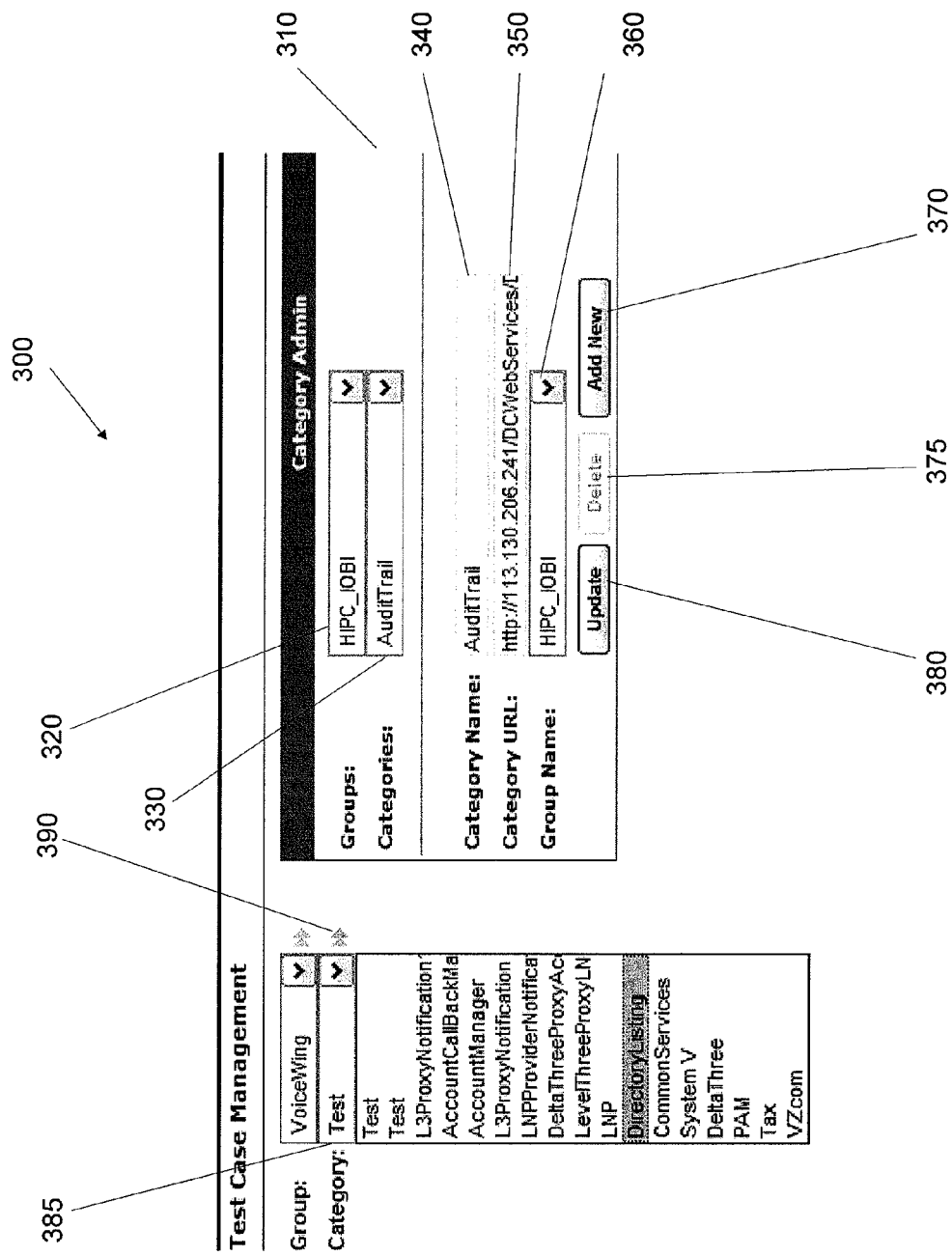
FIG. 3 illustrates an exemplary screen shot of a graphical user interface for performing administrative functions on the attributes of a selected group according to one embodiment.

FIG. 3 illustrates an exemplary screen shot 300 of a GUI generated by a browser launched by one or more of the user machines 110 for providing access to the web services testing tool 120 which provides for the performance of administrative functions on the attributes of a selected group according to one embodiment. Each group has a Group Name, Category Name and Category URL. A category is analogous to an application programming interface ("API") which provides a particular feature to the group/project. Category Admin section 310 is the portion of the GUI wherein the various administrative functions are performed on the attributes of a selected group. As shown in the top portion of Category Admin section 310, groups drop down menu 320 indicates that HIPC_IOBI is the group selected and categories drop down menu 330 indicates that the category selected is Audit-Trail. The bottom portion of Category Admin section 310 reflects the same selections discussed above, namely, Audit-Trail and HIPC_IOBI as indicated respectively by Category Name input box 340 and Group Name drop down menu 360. The bottom portion of Category Admin section 310 also includes a Category URL input box 350. The Category Name box 340 and Category URL box 350 allow the user to input a new category name and URL, respectively, and to modify the existing category name and URL, respectively. The Category Admin section 310 allows the user to perform administrative functions such as adding, updating and deleting categories by pressing the Add New button 370, Update button 380, and Delete button 375 (shown as disabled), respectively. It should be noted that screen shot 300 illustrates a new category to be added, which explains the Delete button 375 being disabled, in accordance with one embodiment. This disablement is a safety measure to prevent a new category being added from being deleted. These administrative functions will be discussed in more detail below, which will include references to screen shots 200 and 300.

Figure 4:
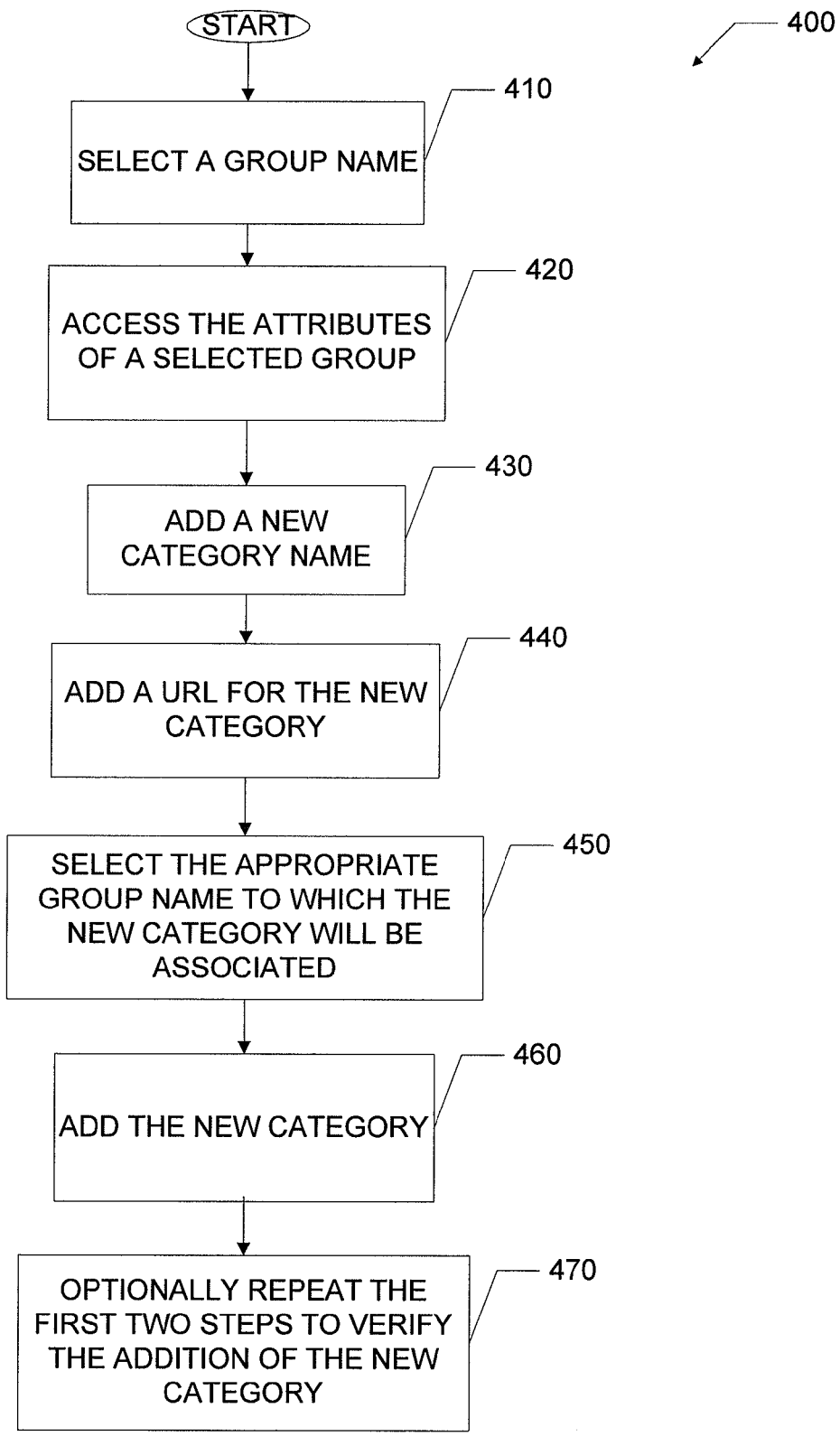
FIG. 4 illustrates a flowchart of the operations performed to add a category according to an exemplary embodiment.
Figure 5:
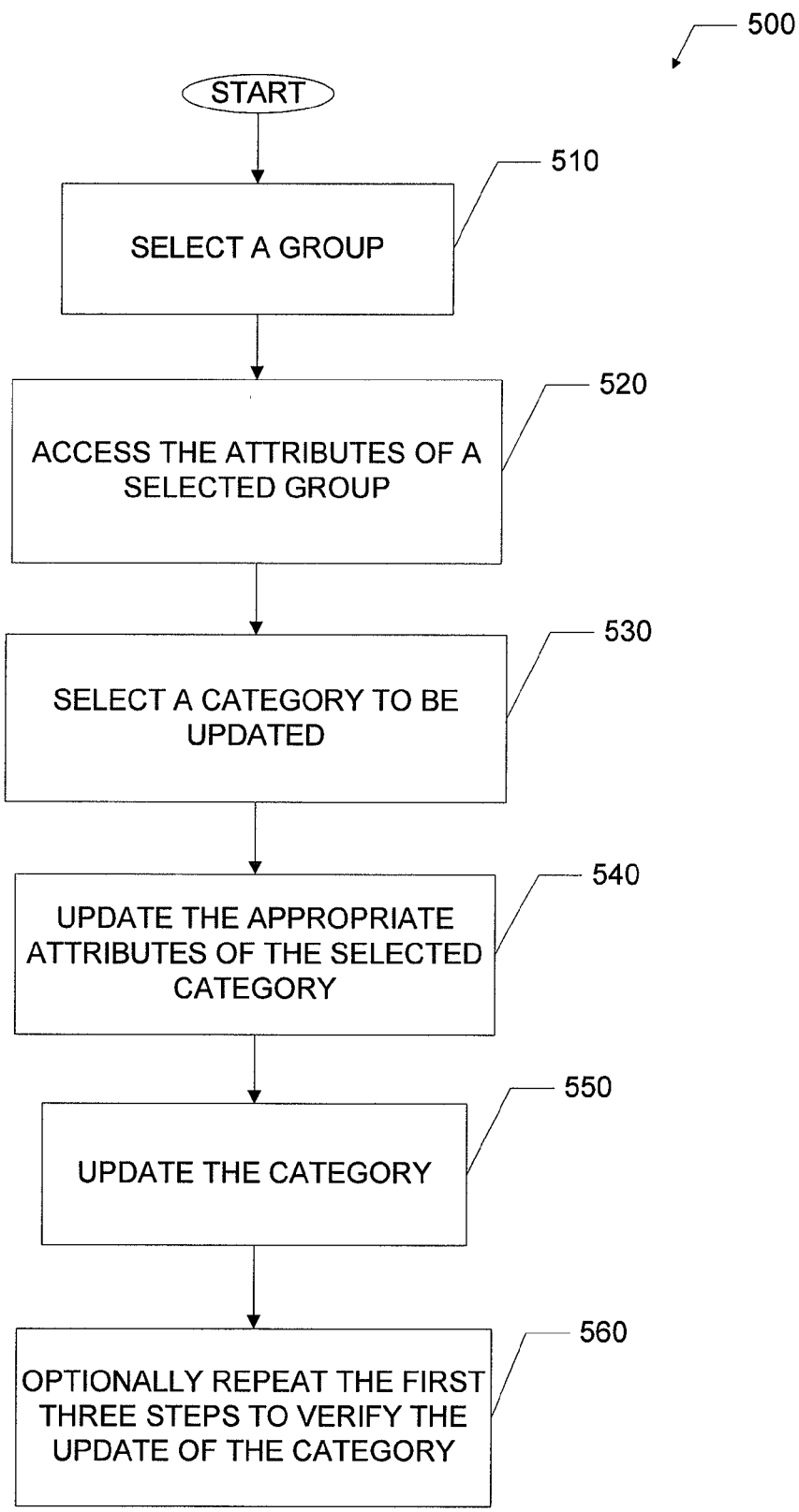
FIG. 5 illustrates a flowchart of the operations performed to update a category according to an exemplary embodiment.
Figure 6:
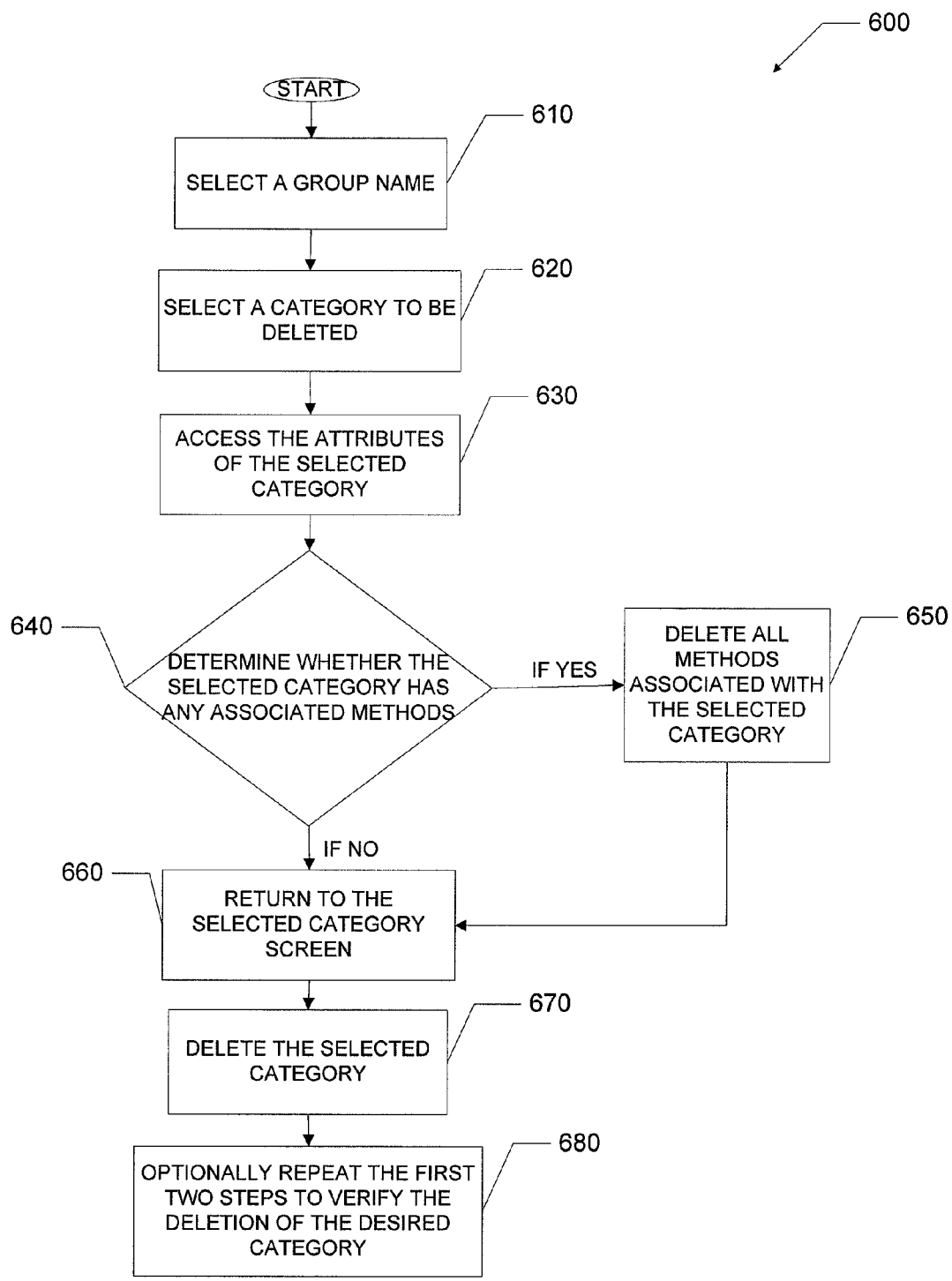
FIG. 6 illustrates a flowchart of the operations performed to delete a category according to an exemplary embodiment.

As shown in FIGS. 4, 5 and 6, categories can be added, updated and/or deleted. Referring to FIG. 4, a flowchart 400 illustrating the operations performed to add a category, according to an exemplary embodiment, is provided. The method includes, at operation 410, selecting a group name, such as from the Group drop down menu 210 as shown in FIG. 2. Operation 420 provides for accessing the attributes of a selected group, such as by clicking the double arrows 230 located next to the Group drop down menu 210, also shown in FIG. 2. This action takes the user to screen shot 300 wherein, on the left side frame, one or more existing categories can be seen, and on the right side frame, Category Admin section 310 can be seen, consistent with one embodiment. According to one embodiment, the one or more existing categories can be a list. At operation 430, a new category name can be entered, such as in the Category Name box 340. Operation 440 provides adding a corresponding URL to the new category, such as in the Category URL box 350. The method further includes selecting the appropriate group from Group Name drop down menu 360, at operation 450, to which the new category will be associated. Operation 460 provides for the submission of the information required to create the new category, such as by clicking on the Add New button 370. Additionally, the method may include, at operation 470, repeating the first two operations and verifying, under the Category drop down menu, that the new category has been properly added to the selected category group. This last operation can be performed via either exemplary screen shots 200 or 300.

Now referring to FIG. 5, a flowchart 500 of the operations performed to update a category, according to an exemplary embodiment, is illustrated. The method includes, at operation 510, selecting a group name, such as from the Group drop down menu 210 as shown in FIG. 2. Operation 520 provides for accessing the attributes of a selected group, such as by clicking the double arrows 230 located next to the Group drop down menu 210, also shown in FIG. 2. This operation takes the user to screen shot 300 wherein, on the left side frame, one or more existing categories can be seen, and on the right side frame, Category Admin section 310 can be seen. According to one embodiment, the one or more existing categories can be a list. At operation 530, an existing category to be updated is selected, such as from Category drop down menu 385. An existing category to be updated can also be selected, such as from Categories drop down menu 330, in accordance with one embodiment. This action will display the category name and URL for the category selected for an update. Operation 540 provides updating the desired attributes of the selected category by submitting the updated information in the appropriate input boxes, such as category name in Category Name box 340 and category URL in box 350. The method may further include, at operation 550, submitting the update information for the selected category, such as by clicking on the Update button 380. If desired, operation 560 provides for repeating the first three operations and verifying, upon selecting the updated category, that the selected category has been properly updated.

Referring to FIG. 6, a flowchart 600 illustrating the operations performed to delete a category, consistent with an exemplary embodiment, is provided. The method includes, at operation 610, selecting a group name, such as from the Group drop down menu 210 as shown in FIG. 2. At operation 620, an existing category to be deleted is selected, such as from the Category drop down menu 385. It should be noted that a selected category cannot generally be deleted unless and until there are no longer web service methods associated with that category. Accordingly, operations 630 to 650 illustrate the verification that needs to occur before a category is deleted, consistent with one embodiment.

Operation 630 provides for obtaining additional information regarding a category, such as by clicking on the double arrows 390 proximately located to the Category drop down menu 385. At operation 640, an inquiry is made to determine whether the category selected to be deleted has associated methods. If the category has no associated methods, the method continues to operation 660. However, if the selected category has at least one associated method, the method continues with operation 650 wherein all the methods associated with the selected category are deleted. Flowchart 1000 of FIG. 10, which illustrates in further detail the method for deleting web methods, is discussed below. Operation 660 provides for the return to the selected category screen, as in for example screen shot 300. The method further includes opting to delete the selected category, such as by clicking on Delete button 375, in operation 670. It should be noted that screen shot 300 is an exemplary screen shot according to one embodiment wherein Delete button 375 is disabled. In yet another embodiment, Delete button 375 will not be disabled, thus allowing it to be selected for the subsequent deletion of a selected category as provided at operation 670. At operation 680, the first two operations may be repeated to verify the deletion of the selected category.

Figure 7:
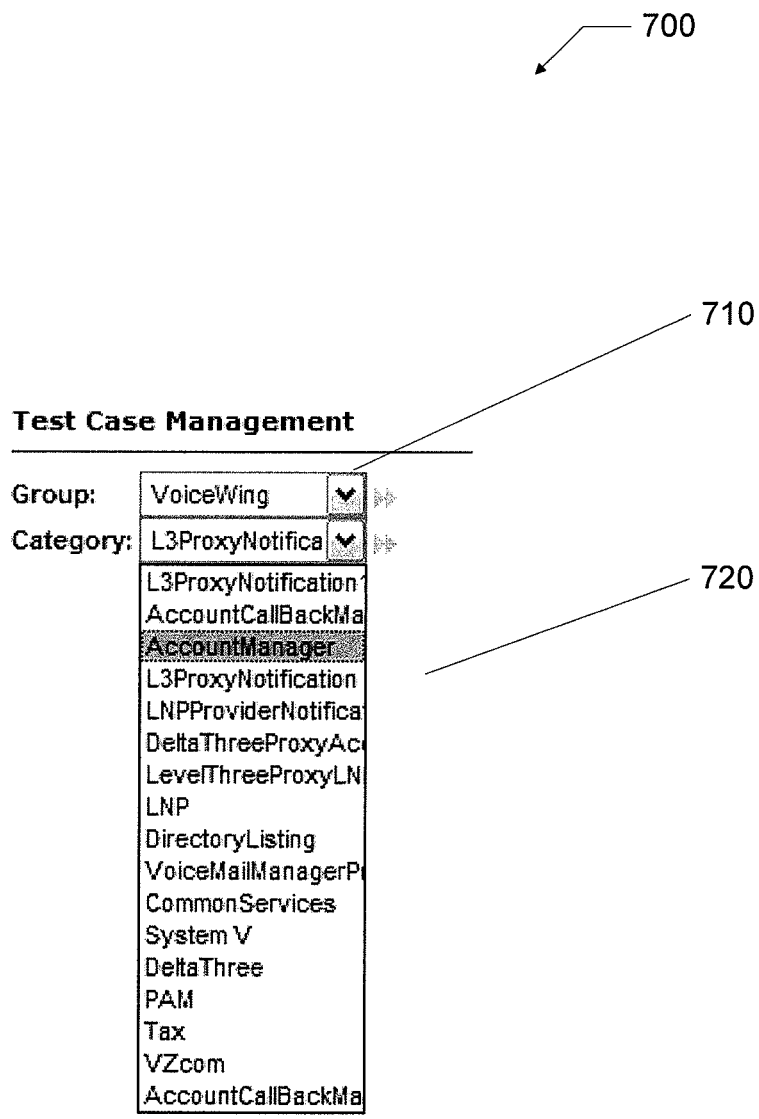
FIG. 7 illustrates an exemplary screen shot of a graphical user interface showing a selection of categories associated with a selected group according to one embodiment.

In FIG. 7, an exemplary screen shot 700 of a GUI generated by a browser launched by one or more of the user machines 110 for providing access to the web services testing tool 120 provides for the selection of one or more categories 720 associated with a selected group according to one embodiment. According to one embodiment, the one or more existing categories can be a list. As shown in FIG. 7, the group/project selected from the Group drop down menu 710 is VoiceWing. The list of categories 720 provide the current categories associated with the selected group/project, e.g., VoiceWing. As mentioned above, a category can be thought of as set of modules/features associated with a selected group. Furthermore, each category can have a set of associated web service methods that implement the functionality of the given category. Each of these web methods can be considered as a function that implements the feature of the selected category or the module related to the selected group. The administrative functions of adding, updating, and deleting, for example performed on the categories as discussed above, can also be performed on the web service methods. Moreover, it should be understand that a similar interface, e.g., a GUI, may be provided to facilitate these administrative functions for the web services methods, as described above for the administrative functions applicable to categories. These administrative functions are discussed in greater details below.

Figure 8:
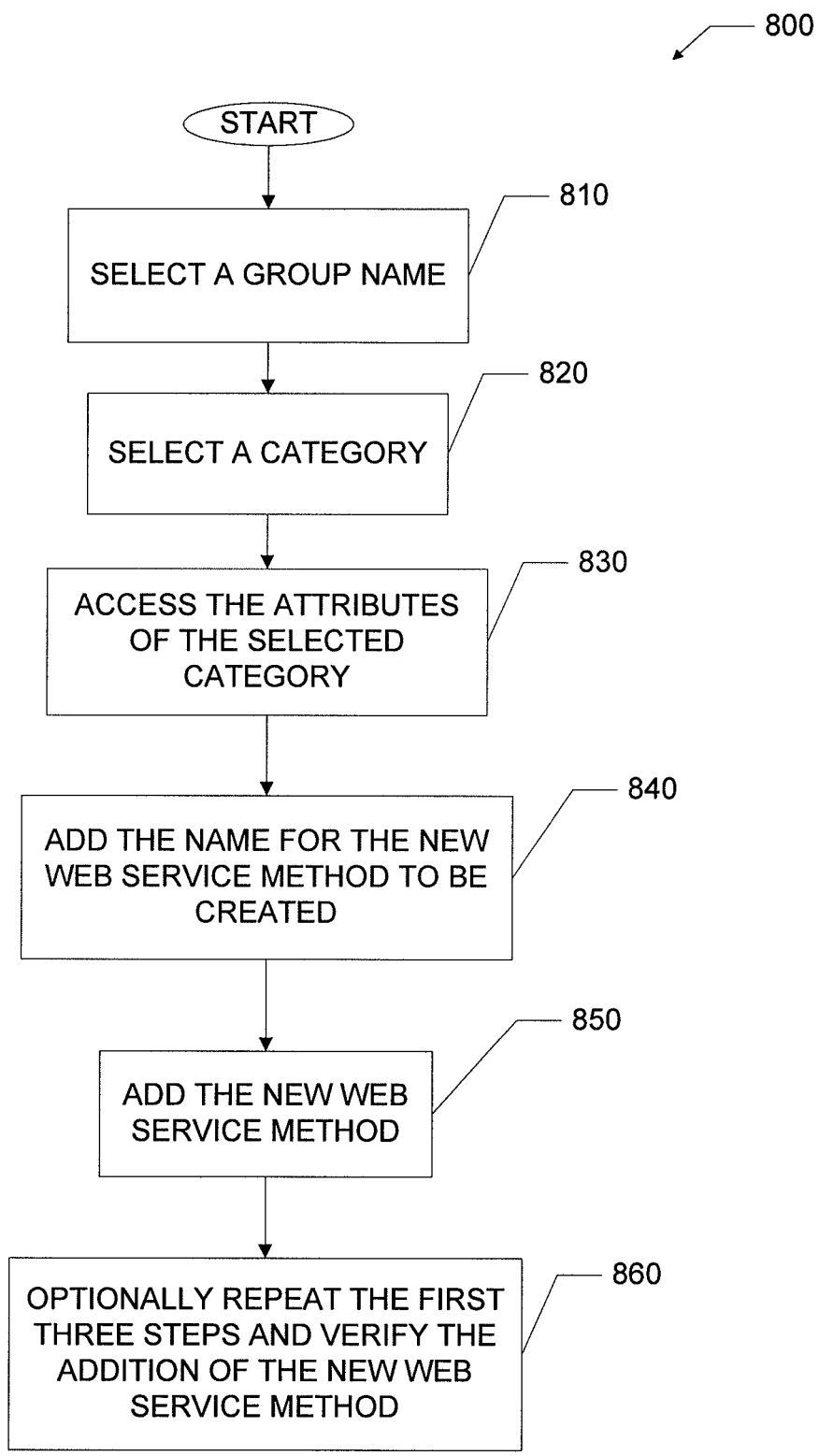
FIG. 8 illustrates a flowchart of the operations performed to add a web service method according to an exemplary embodiment.

Referring to FIG. 8, a flowchart 800 of the operations performed to add a web service method, according to an exemplary embodiment, is provided. The method includes, at operation 810, selecting a group name, such as from a group drop down menu. At operation 820, a category associated with the selected group is selected, such as from a category drop down menu. Operation 830 provides for accessing the attributes of a selected category, such as by clicking on the double arrows proximately located to the category drop down menu. This operation takes the user to a screen, similar to screen shot 300 according to one embodiment, wherein, on the left side frame, one or more existing web service methods can be seen, and on the right side frame, an administrative section, similar to Category Admin section 310 according to one embodiment, can be seen. At operation 840, a new web service method name can be provided, such as by being entered in an input box similar to the Category Name box 340 according to one embodiment. The method further includes, at operation 850, submitting the information for the new method, such as by selecting an Add button similar to Add New button 370 according to one embodiment. Operation 860 provides for repeating the first three operations and verifying, under the one or more web service methods associated with the selected category, that the new method has been properly added to the selected category.

Figure 9:
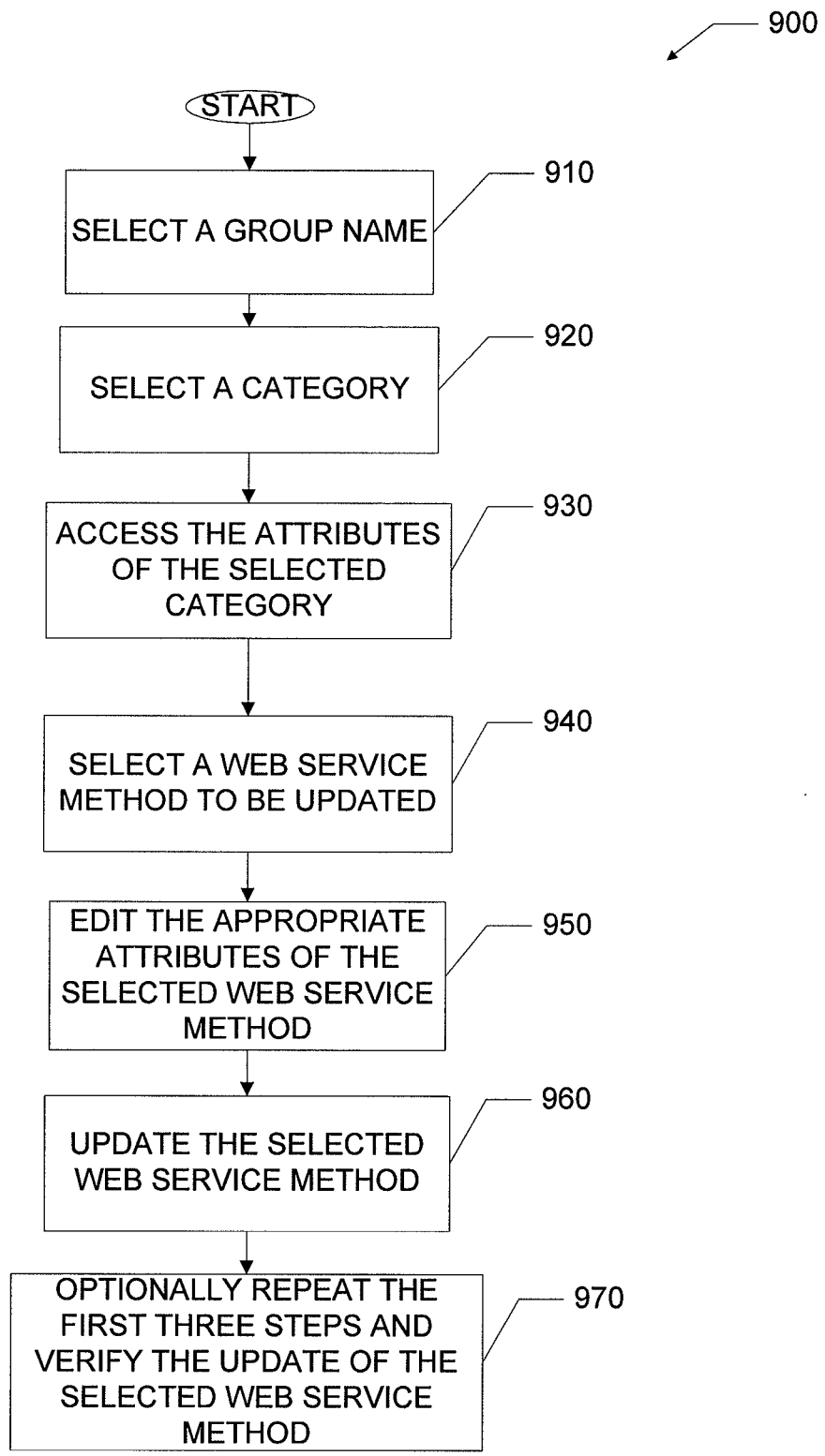
FIG. 9 illustrates a flowchart of the operations performed to update a web service method according to an exemplary embodiment.

Reference is now made to flowchart 900 of FIG. 9, which illustrates the operations performed to update a web service method according to an exemplary embodiment. The method includes, at operation 910, selecting a group name, such as from a group drop down menu. At operation 920, a category associated with the selected group is selected, such as from a category drop down menu. Operation 930 provides for accessing the attributes of a selected category, such as by clicking on the double arrows proximately located to the category drop down menu. This operation takes the user to a screen as described and explained above. At operation 940, a web service method to be updated is selected from one or more of web service methods associated with the selected category. Operation 950 provides editing the appropriate attribute(s) of the selected method. According to one embodiment, only the name of the selected web service method is changed in manner similar to updating a selected category as discussed above. The method further includes, at operation 960, submitting the new information of the selected method, such as by selecting an update button to. Operation 970 provides for repeating the first three operations and verifying, upon selecting the updated web service method, that the selected method has been properly updated.

Figure 10:
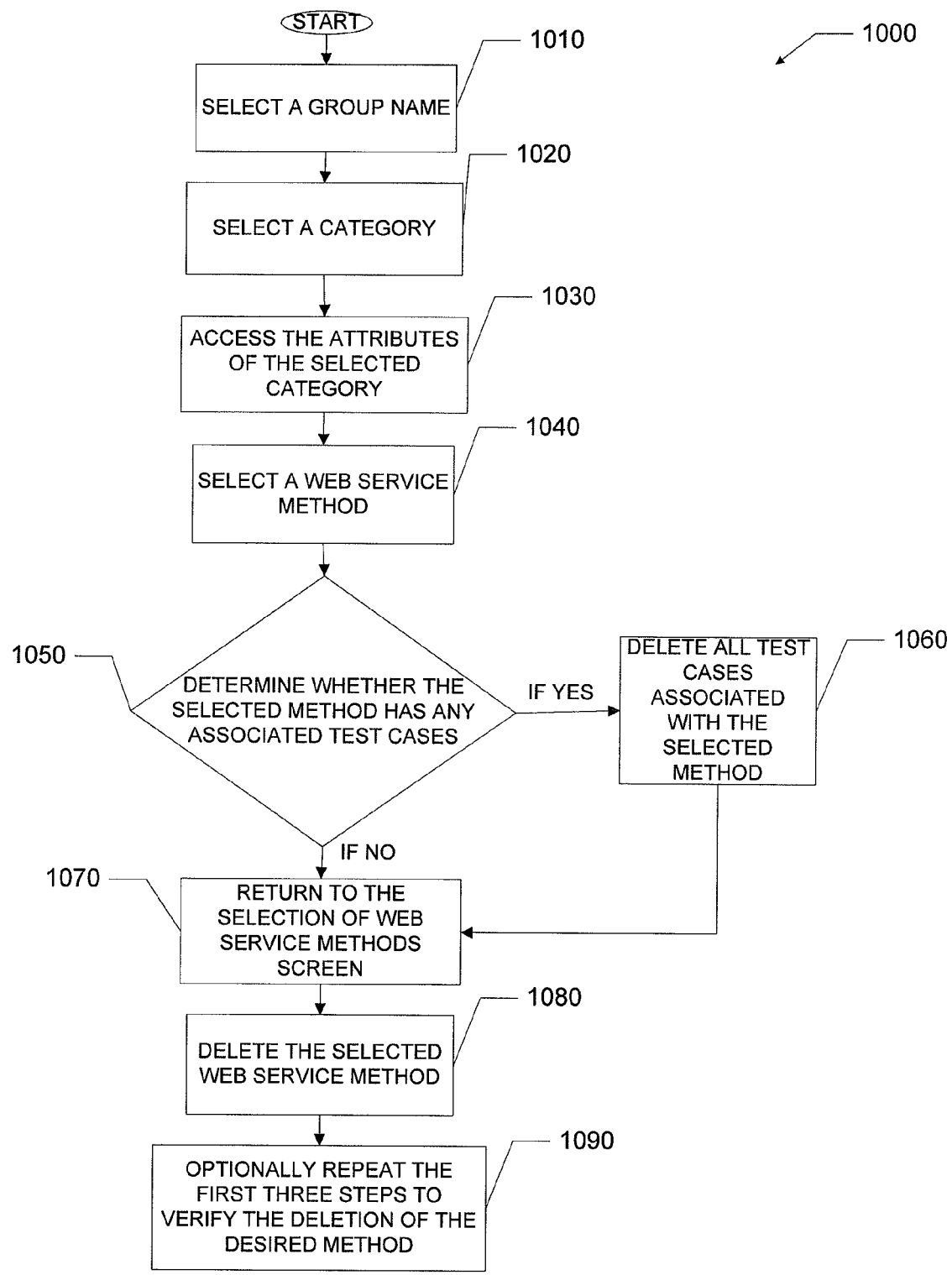
FIG. 10 illustrates a flowchart of the operations performed to delete a web service method according to an exemplary embodiment.

Referring now to FIG. 10, a flowchart 1000 of the operations performed to delete a web service method, according to an exemplary embodiment, is provided. The method includes, at operation 1010, selecting a group name, such as from a group drop down menu. Operation 1020 provides selecting a category, such as from a category drop down menu that provides one or more of categories associated with the selected group. At operation 1030, the attributes of a selected category are accessed, such as by selecting double arrows located next to the category drop down menu. This operation takes the user to a screen that provides one or more web service methods associated with the selected category; each method being coupled with a Delete button, consistent with one embodiment of the present invention. Each web service method is a hyperlink, according to one embodiment. It should be noted that a selected web service method cannot be deleted unless and until there are no longer test cases associated with that method. Accordingly, operations 1040 to 10600 illustrate the verification that needs to occur before a web service method is deleted, consistent with one embodiment.

Operation 1030 provides for selecting the web service method to be deleted. This operation takes the user to a screen that provides one or more test cases associated with the selected web service method. According to one embodiment, the one or more test cases can be a list. At operation 1050, an inquiry is made to determine whether the method selected to be deleted has any associated test cases. If the web service method has no associated test cases, the method continues to operation 1070. However, if the selected method has at least one associated test case, the method continues with operations 1060 wherein all the test cases associated with the selected web service method are deleted. Screen shot 1900 in FIG. 19 and accompanying flowchart 2000 in FIG. 20, which illustrate in further detail the method for deleting test cases, are discussed below. Operation 1070 provides for returning to the screen display of the list of web service methods as discussed above. The method further includes deleting a web service method, such as by selecting the Delete button associated with the web service method to be deleted at operation 1080. At operation 1090, the first three operations may be repeated to verify the deletion of the selected method.

Figure 11:
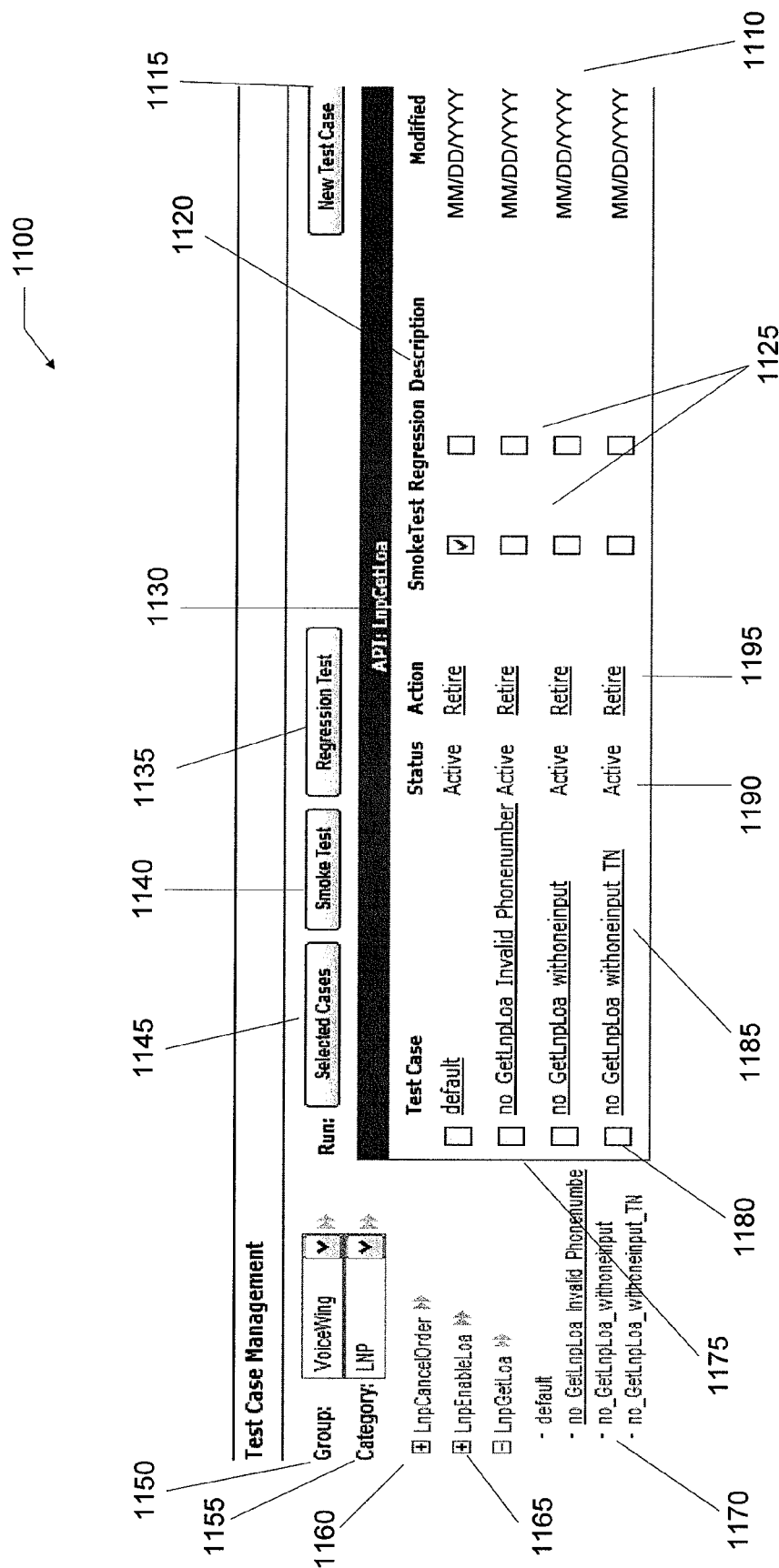
FIG. 11 illustrates an exemplary screen shot of a graphical user interface for a test case summary page for managing a selection of test cases associated with a selected group according to one embodiment.

In FIG. 11, an exemplary screen shot 1100 of a GUI generated by a browser launched by one or more of the user machines 110 for providing access to the web services testing tool 120 shows a test case summary page for managing one or more test cases associated with a selected web service method, according to one embodiment. By selecting a group and then selecting a category associated with the selected group, one or more web service methods will be provided. According to one embodiment, the one or more web service methods can be a list of hyperlinks. Selecting a hyperlinked web service method name may cause the display one or more test cases associated with the selected method, according to one embodiment. The one or more test cases can also be displayed by selecting an expandable node symbol [+] located next to each of the listed hyperlinked web service method names, according to one embodiment. These test cases can generally be grouped as Smoke and/or Regression test depending on the preference of the user. The method described above will now be illustrated in further detail, using FIG. 11, according to one embodiment.

As shown, the group selected from Group drop down menu 1150 is VoiceWing. According to one embodiment, the categories associated with a selected group are automatically generated in Category drop down menu 1155 upon the selection of the group. The category selected from Category drop down menu 1155 is LNP. According to one embodiment, the web service methods associated with a selected category are automatically generated upon the selection of the category. Upon selection of a category, one or more web services methods 1160 associated with the selected category are also automatically generated, in accordance with one embodiment. The one or more methods can be a list of method names and/or each method name can be hyperlinked according to one embodiment. Each hyperlinked method can also be coupled with an expandable node symbol [+] 1165 as shown in FIG. 11, consistent with one embodiment. By clicking on expandable node 1965, one or more test cases associated with the selected web service method is automatically generated below the selected method and on the right side frame of the screen, as shown in FIG. 11. According to one embodiment, the one or more web service methods can be a list of web service methods 1170 on the left side frame and another list of web service methods 1175 on the right side frame.

The right side frame provides test case details and administrative functions to be performed on the test cases. The right side frame enables a user to classify one or more test cases as Smoke Test or Regression, retire a test case and temporarily exclude it from a test run, permanently delete a test case, and run all or selected test cases. For example, the right side frame provides: test case names, for example test case name 1185; test case select boxes, for example test case select box 1180; test case classification boxes to classify a test case as either Smoke Test and/or Regression, for example boxes 1125; a test description, for example element 1120; test case modification date, for example elements 1110; test case status, for example element 1190; and test case action or the actions taken on the test case, for example element 1195, all shown in FIG. 11. According to one embodiment, in the event the user cannot recall the web service method whose test cases are displayed, the user can locate the name in API heading 1130. The right side frame also provides buttons 1135 to 1145 that allow the user to run the test cases classified as Regression, the test cases classified as Smoke Test, or all the selected test cases, respectively. Button 1115 allows the user to create a new test case. Each test case has a set of associated attribute, for example, Name, Description, Priority, Modified, Request XML, Output XML, Input Value, Success criteria, according to one embodiment. As mentioned above, several administrative functions can be performed on the test cases such as, for example, adding, saving, retiring, activating, deleting, executing. These and more functions are discussed below.

Figure 12:
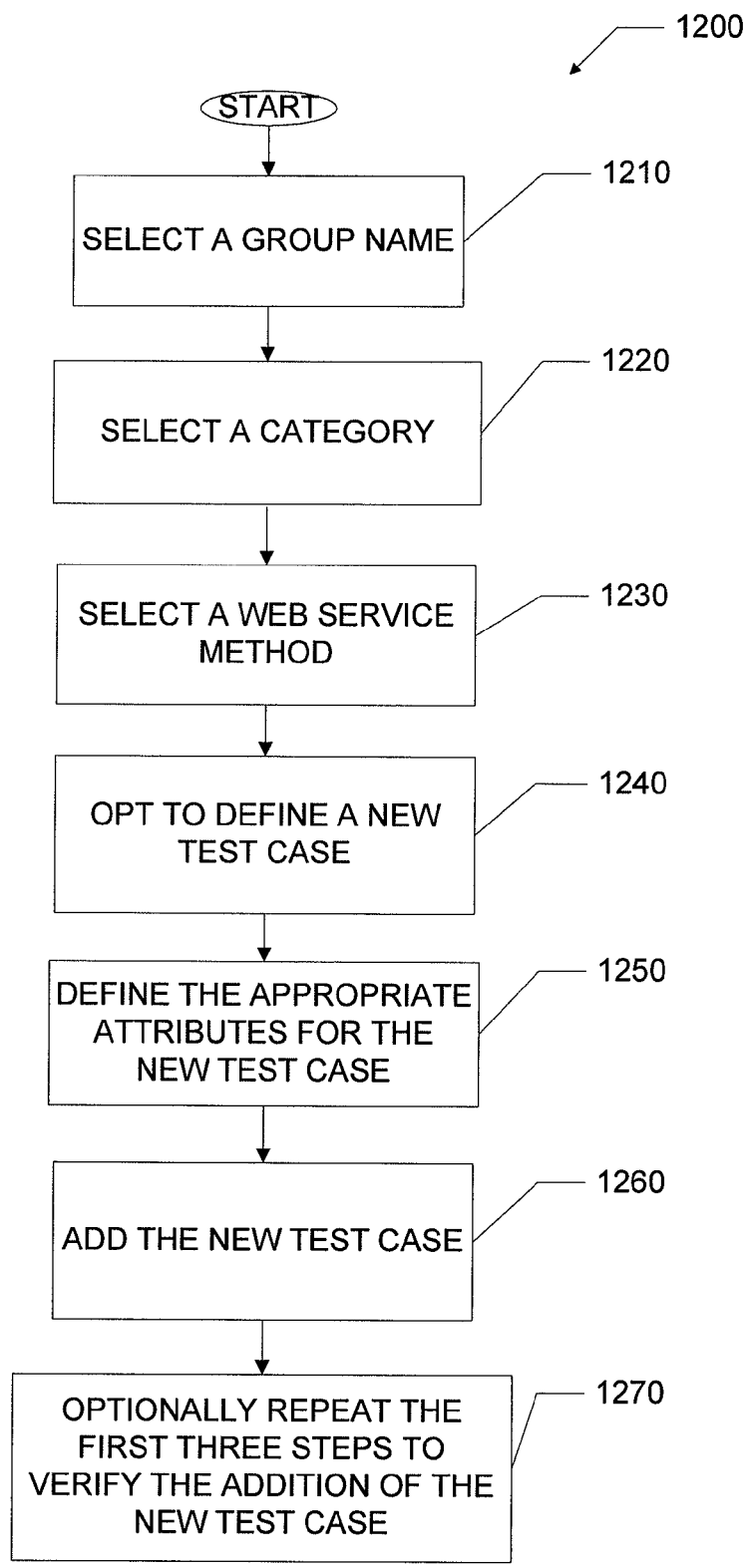
FIG. 12 illustrates a flowchart of the operations performed to add a test case according to an exemplary embodiment.

Referring to FIG. 12, a flowchart 1200 of a method for adding a test case according to an exemplary embodiment is illustrated. The method includes selecting a group, such as from among one or more groups under a group drop down menu at operation 1210. Operation 1220 provides for selecting desired category, such as from one or more categories under a category drop down menu. At operation 1230, a web service method is selected from one or more web service methods. According to one embodiment, each of the one or more categories and web service methods are automatically generated upon the selection of a group and a category, respectively. The method continues by identifying that a new test case is to be added, such as by selecting the New Test Case button at operation 1240, such as for example button 1115. This operation takes the user to a screen where the appropriate attributes for the new test case can be defined at operation 1250. The attributes can be, for example, the input and success parameters, priorities assignment, and name, according to one embodiment of the present example. The method further includes submitting the information for the new test case, such as by selecting an Add button. At operation 1270, the first three operations may be repeated to verify the addition of the new test case.

Figure 13:
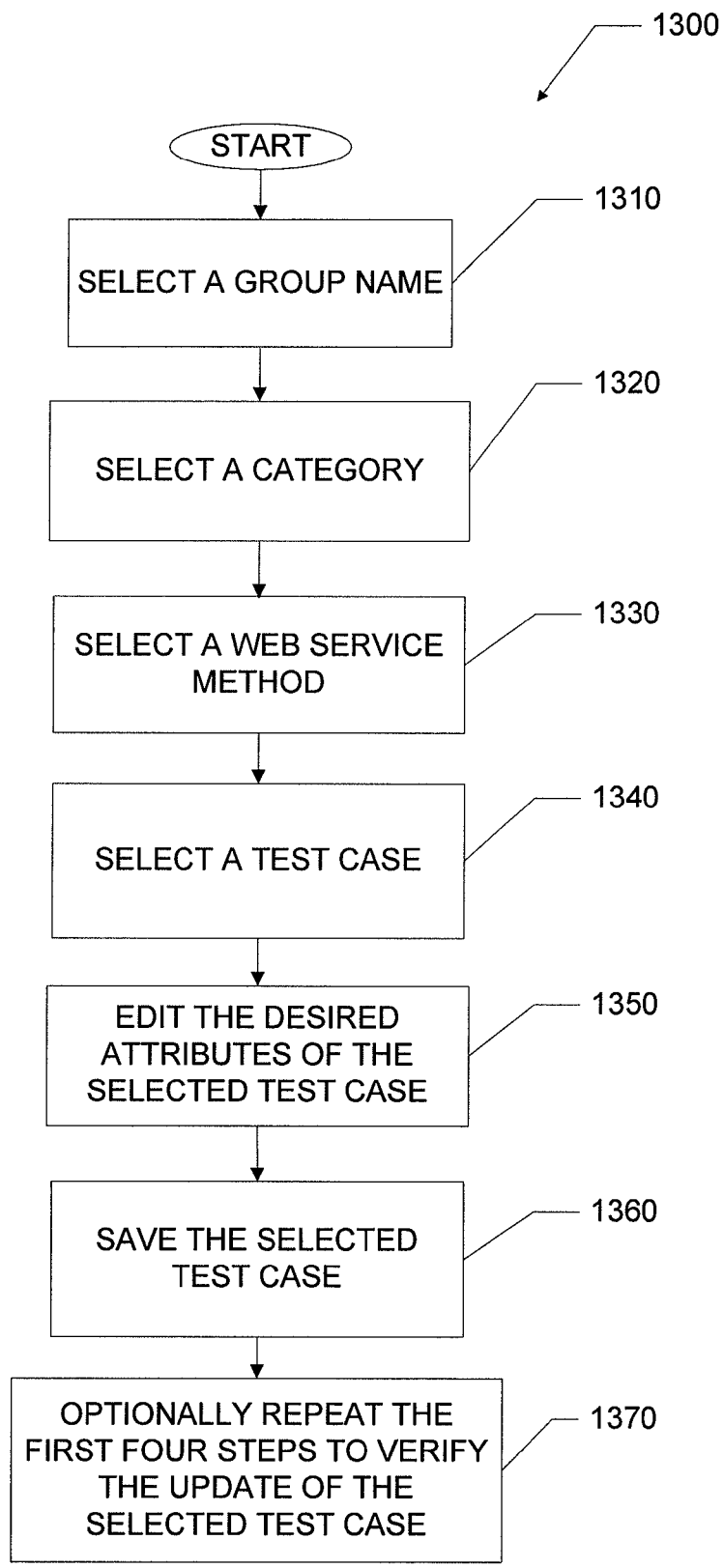
FIG. 13 illustrates a flowchart of the operations performed to save a test case according to an exemplary embodiment.

Referring now to FIG. 13, a flowchart 1300 of a method for saving a test case according to an exemplary embodiment is provided. The method includes selecting a group, a category and a web service method at operations 1310-1330 as described in further detail above. Operation 1340 provides for selecting a test case. According to one embodiment, a test case can be selected by clicking on the web service method name and then selecting the test case from the right side frame, as illustrated in FIG. 11. According to another embodiment, a test case can be selected by selecting an expandable node symbol 1165 located next to each web service method name and then selecting a test case link listed under the selected web service method, also as illustrated in FIG. 11. Operation 1350 provides for editing the attributes of the selected test case that are desired to be modified. According to one embodiment, the attributes modified are, for example, the test case priority, the input/success criteria, the category URL, and the Request XML. At operation 1360, the modified information is saved, such as selecting a Save button, in order to make the modification permanent. The method may further include, at operation 1370, repeating the first four operations to verify the modification of the selected test case.

Figure 14:
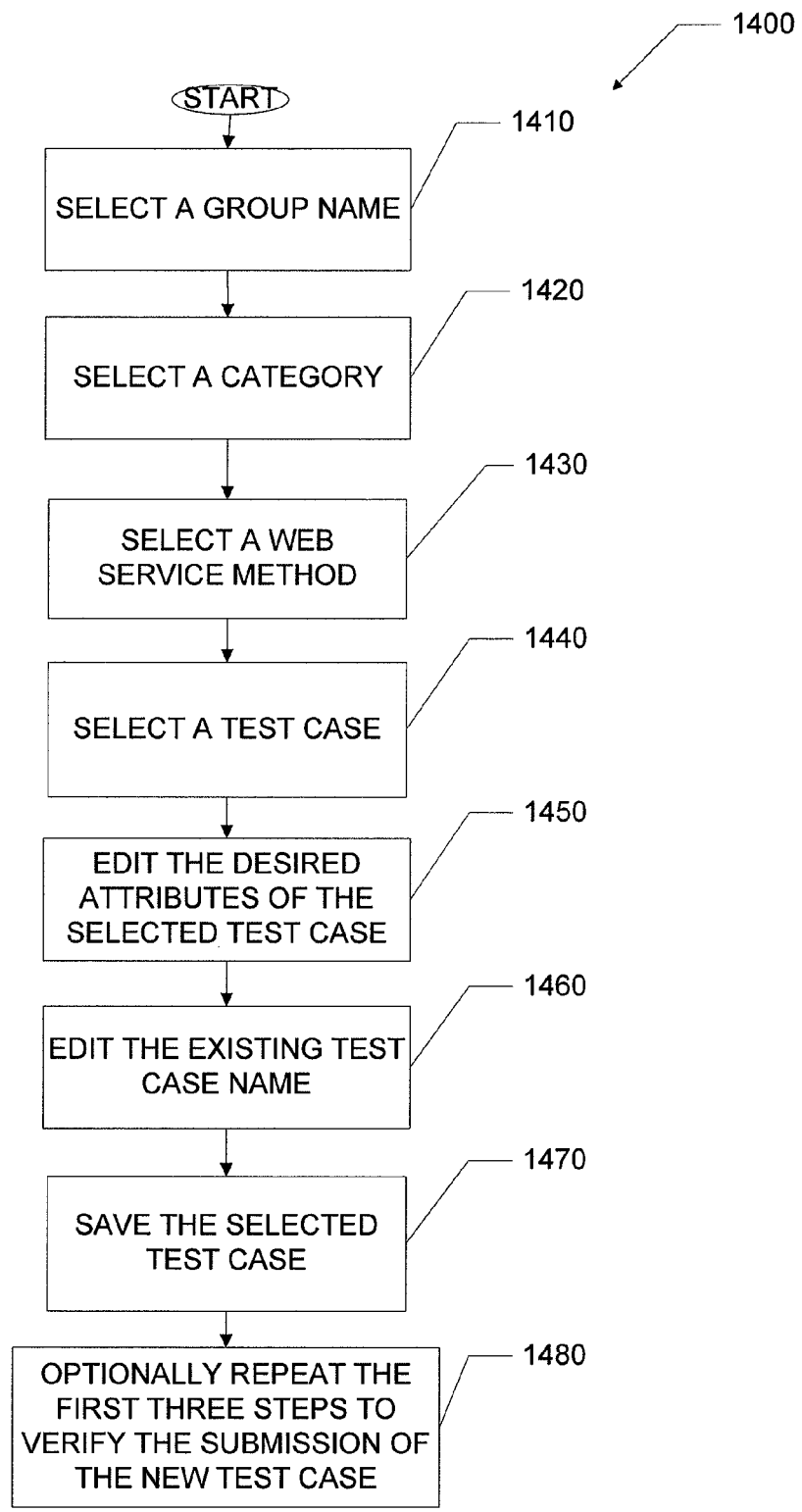
FIG. 14 illustrates a flowchart of the operations performed to add a new test case based on the information of an existing test case according to an exemplary embodiment.

Reference is now made to FIG. 14, which illustrates a flowchart 1400 of one embodiment of a method for adding a new test case based on the information of an existing test case. The method includes selecting a group, a category, a web service method, and selecting a test case at operations 1410-1440 as described in further details above. At operation 1450, the attributes of the selected test case desired to be edited are modified. An example of possible attributes to modify is discussed above. The method continues with the modification of the existing name of the selected test case at operation 1460. Operation 1470 provides for saving the attributes of the selected test case, whether modified or not modified, under the new name chosen at operation 1460, thereby essentially creating a new test case. In one embodiment, the attributes are saved by selecting a Save As button. At operation 1480, the first three steps of the method may be repeated to verify that the new test case has been created. This method provides another alternative for creating a new test case, based on one or more attributes of the selected test case, whether modified or not modified. This method is appropriate when the user wants to keep one or more attributes of a selected test case without having to go through the entire process of creating a new test case. In another embodiment, the user only modifies the existing name of the selected test case and therefore, operation 1450 is bypassed.

Figure 15:
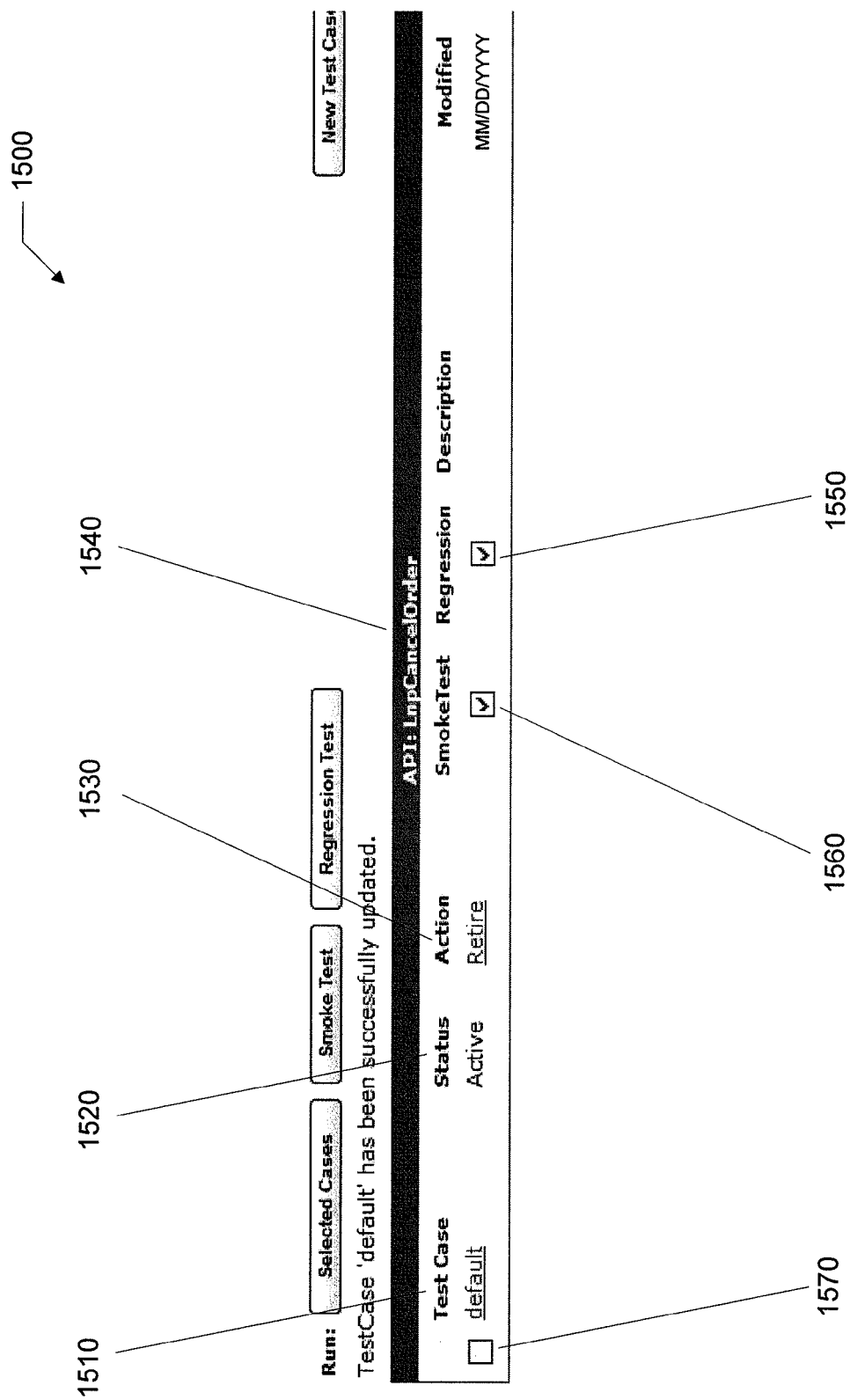
FIG. 15 illustrates an exemplary screen shot of a graphical user interface showing an administrative functionality applicable to a selected test case according to one embodiment.
Figure 16:
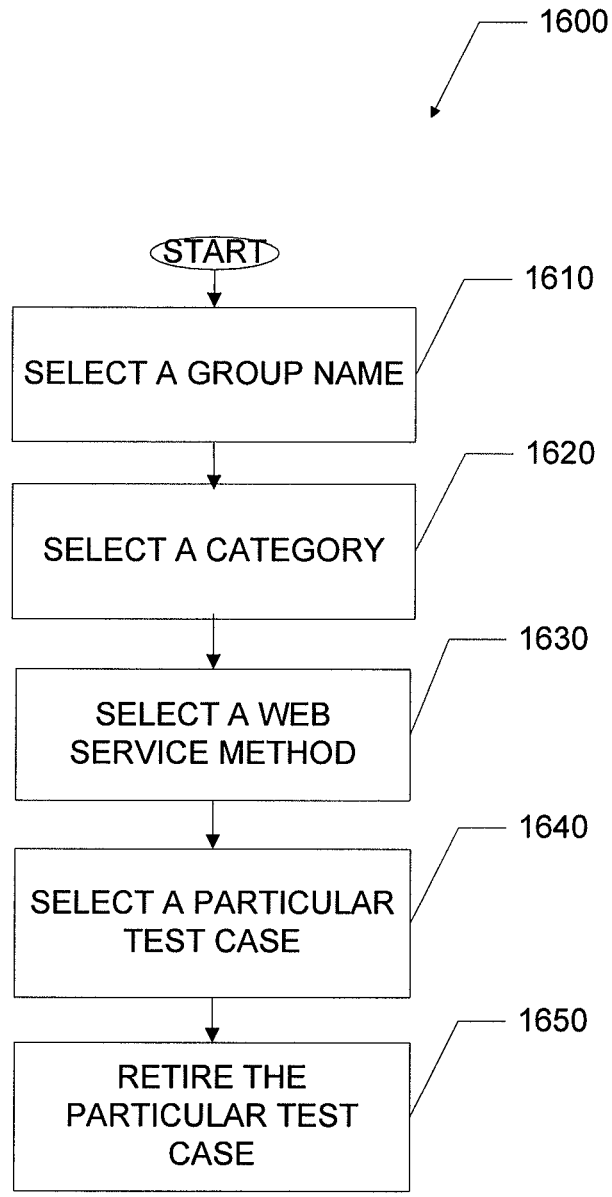
FIG. 16 illustrates a flowchart of the operations performed to retire a test case according to an exemplary embodiment of the present invention.

In FIG. 15, an exemplary screen shot 1500 of a GUI generated by a browser launched by one or more of the user machines 110 for providing access to the web services testing tool 120 depicts an administrative function applicable to a selected test case according to one embodiment. The function illustrated in FIG. 15 is Retire wherein a selected test case can be temporarily excluded from subsequent Smoke Test and/or Regression test runs. The features of screen shot 1500 are similar to those of screen shot 1100 in FIG. 11 and have already been discussed in detail above. The name of the test case selected is default, as shown in FIG. 15 under Test Case name section 1510. The web service method to which the selected test case is associated is LnpCancelOrder as shown under method or API name section 1540. The selected test case is chosen to undergo a Smoke Test and a Regression test, as shown in FIG. 15. Under Action section 1530 for the selected test case, the Retire feature is indicated. According to one embodiment, the Retire feature will be indicated under Action section 1530 if the test case is selected after the group, the category, and the web service method have all been selected. In accordance with one embodiment, before a selected test case is retired, the status of a selected test case is Active, as shown under Status section 1520 in FIG. 15. The Retire feature can be a hyperlink, consistent with one embodiment. According to one embodiment, the Retire link is available when the status of the selected test case is Active. When the user selects the Retire link, the corresponding selected test case will be removed from subsequent test runs. A flowchart 1600 depicted in FIG. 16 illustrates a method for retiring a test case according to an exemplary embodiment.

Figure 17:
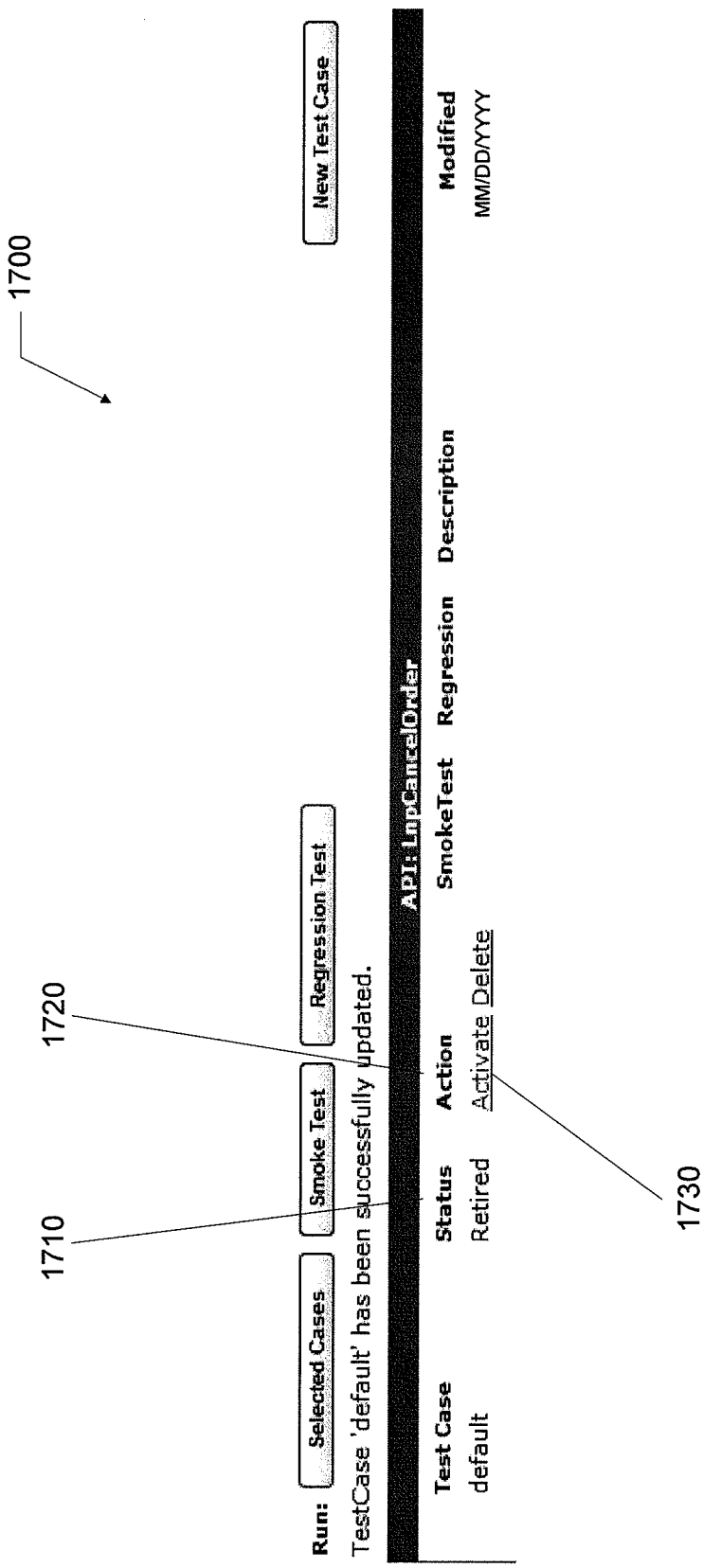
FIG. 17 illustrates an exemplary screen shot of a graphical user interface showing another administrative functionality applicable to a selected test case according to one embodiment.
Figure 18:
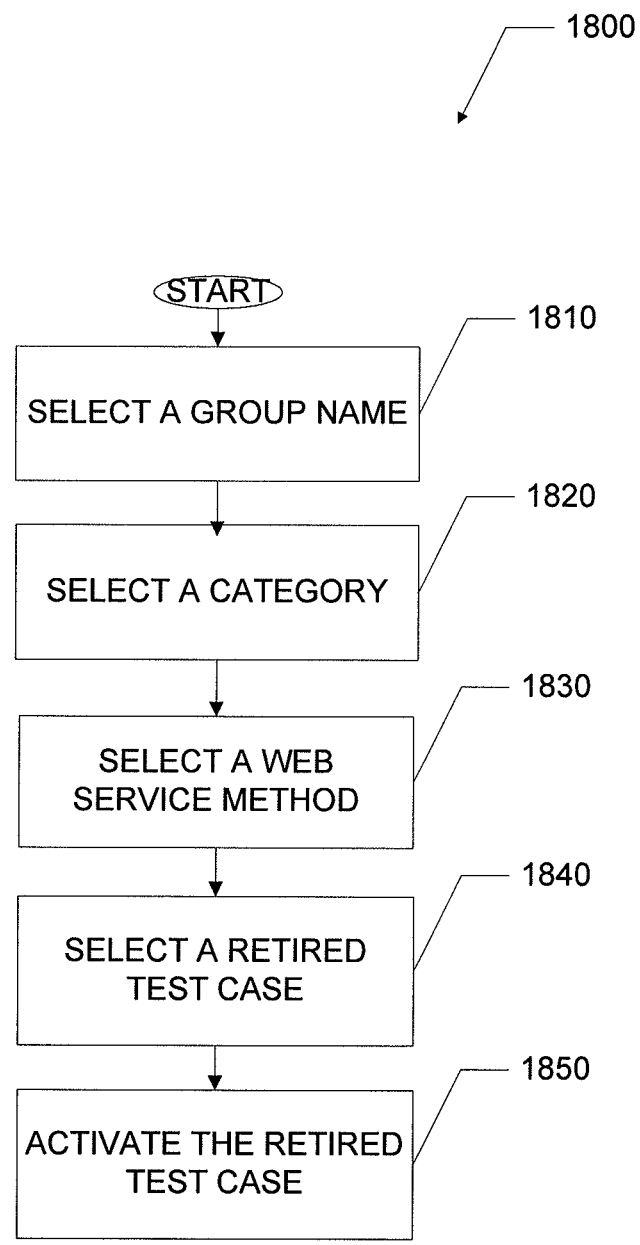
FIG. 18 illustrates a flowchart of the operations performed to activate a retired test case according to an exemplary embodiment.

Referring now to FIG. 17, an exemplary screen shot 1700 of a GUI generated by a browser launched by one or more of the user machines 110 for providing access to the web services testing tool 120 which depicts another administrative functionality applicable to a selected test case according to one embodiment is provided. The function illustrated in FIG. 17 is Activate wherein a retired test case can be activated and hence included again in subsequent test runs. The features of screen shot 1700 are similar to those of screen shot 1100 in FIG. 11 and have already been discussed in detail above. The test case name and the web service method shown in FIG. 17 are the same as the ones shown in FIG. 15, namely, default and LnpCancelOrder. When a selected test case is retired, the Retire link, under Action section 1530 shown in FIG. 15, is replaced with two other links, namely, Activate and Delete, under Action section 1720 as shown in FIG. 17. Additionally and according to one embodiment, the status of a test case that has been retired is Retired, as shown under Status section 1710. According to yet another embodiment, once a selected test case is retired, the corresponding checkboxes for selecting the test case, a Smoke Test, and a Regression, illustrated by checkboxes 1570, 1560, and 1550 shown in FIG. 15, no longer become available as shown in FIG. 17. The Activate feature may be a hyperlink, consistent with one embodiment. When the user selects Activate link 1730, the corresponding retired test case will then be included again in subsequent test runs. When a selected test case is activated, its status and action revert back to their initial condition as shown in FIG. 15, according to one embodiment. The checkboxes 1550-1570 discussed above also become available again as shown in FIG. 15. A flowchart 1800 provided in FIG. 18 illustrates a method for activating a retired test case according to an exemplary embodiment.

Reference is now made to FIG. 19, which illustrates an exemplary screen shot 1900 of a GUI generated by a browser launched by one or more of the user machines 110 for providing access to the web services testing tool 120 which depicts yet another administrative functionality applicable to a selected test case according to one embodiment. The function illustrated in FIG. 19 is Delete wherein a retired test case is deleted and hence permanently removed for subsequent test runs. The features of screen shot 1900 are similar to those of screen shots 1100 and 1700 in FIGS. 11 and 17, respectively, and have already been discussed in detail above. The test case and the web service method shown in FIG. 19 are the same as the ones shown in FIG. 15, namely, default and LnpCancelOrder. Additionally, the conditions and attributes of a retired test case, for example status and action, are discussed in detail above.

Figure 20:
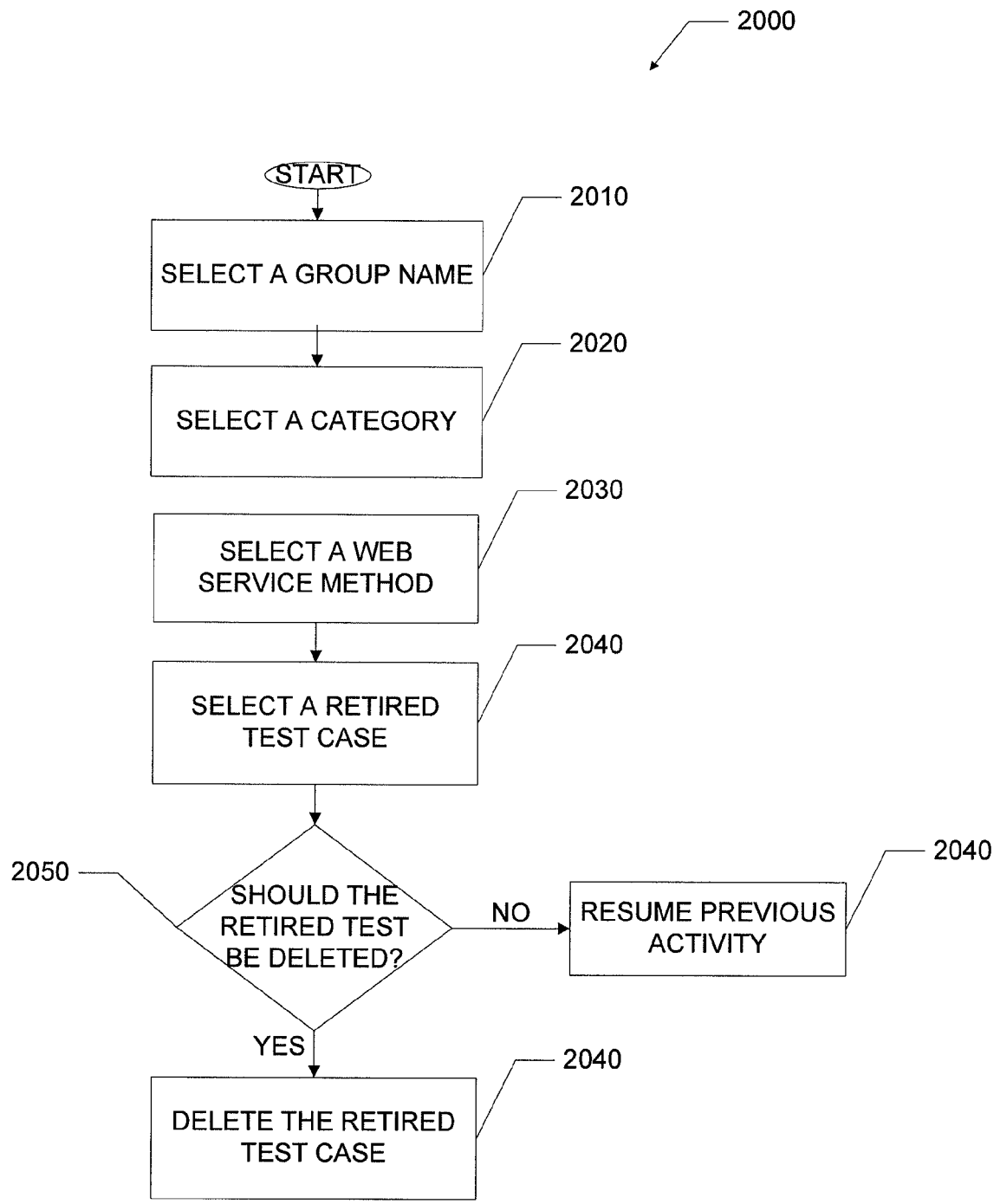
FIG. 20 illustrates a flowchart of the operations performed to delete a retired test case according to an exemplary embodiment.

When a selected test case is retired, the user can evaluate the significance of the test case. Accordingly, after due consideration of the retired test case, if the user determines that the test case can be permanently removed from subsequent test runs, the user can select a Delete link 1910, consistent with one embodiment. According to another embodiment, the user can determine that the retired test case should neither be deleted nor be activated, in which case the user can either take no further actions or return to any previous activity being undertaken. The Delete function should be used with caution as any retired test case that is deleted is permanently removed from subsequent test runs. Because of the proximity of the Activate and Delete links and the relative permanence brought about by the selection of the Delete function, it is advisable for the user to be able to easily select the appropriate function desired. Therefore, according to one embodiment, the Activate link is of a format different from that the Delete link to allow the user to easily differentiate and distinguish the two functions, for example, different color, font, style, or size. A flowchart 2000 provided in FIG. 20 illustrates a method for deleting a retired test case according to an exemplary embodiment.

Figure 21:
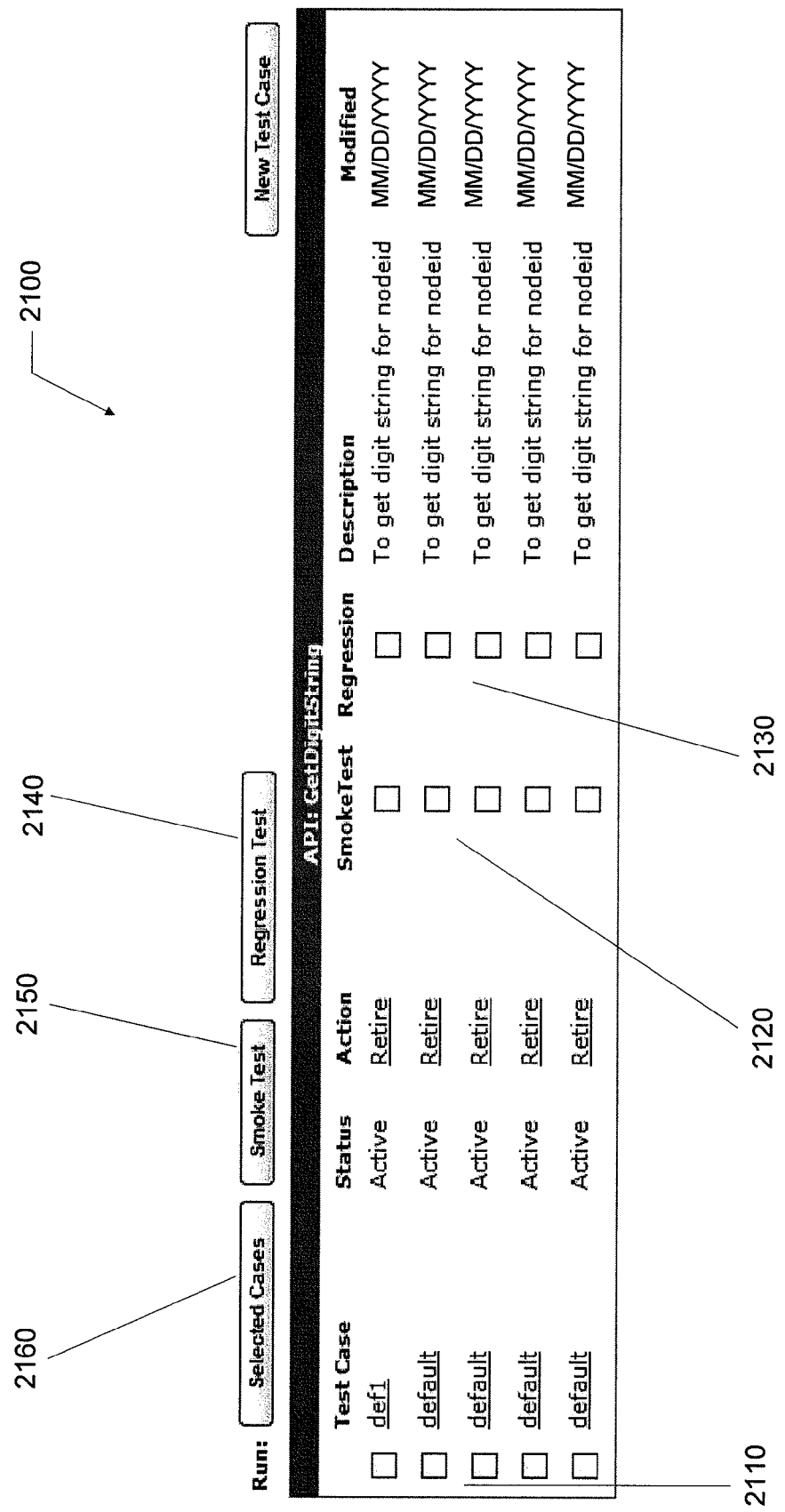
FIG. 21 illustrates an exemplary screen shot of a graphical user interface displaying one or more test cases, associated with a selected method, to be classified according to one embodiment.

In FIG. 21, an exemplary screen shot 2100 of a GUI generated by a browser launched by one or more of the user machines 110 for providing access to the web services testing tool 120 displays one or more test cases, associated with a selected method, to be classified according to one embodiment. The features of screen shot 2100 are similar to those of screen shot 1100 in FIG. 11 and have already been discussed in detail above. Screen shot 2100 also provides checkboxes 2110 for selecting one or more test cases, checkboxes 2120 for selecting one or more test cases as Smoke, and checkboxes 2130 for selecting one or more test cases as Regression. One or more test cases can be selected and classified as either Smoke Tests, Regression Tests, regular tests (i.e. neither one of Smoke or Regression), or any combination of the three, as shown in FIG. 15. According to one embodiment, one or more test cases can be stored as a single test, either Smoke, Regression, or regular test.

As used herein, a Smoke test is a test conducted to analyze, on a relatively superficial level, the functionalities of the selected group or application. This test is similar to a health check of the group. According to one embodiment, this type of test allows the user to select one or more important test cases, save those selected test cases together as a single smoke test, and assign the single test a name. In this manner, the saved test can be accessed and run again. Classification of the one or more selected test cases as Smoke test can be effectuated by clicking on the corresponding one of checkboxes 2120, consistent with one embodiment. Upon clicking on a Smoke Test button 2150, all the test cases whose corresponding Smoke Test checkbox has been checked will undergo a Smoke test.

If the user wants to conduct a more in-depth testing of the group, a Regression test should be conducted. For a deeper testing of the functionalities of the selected group, a Regression test should be conducted. According to one embodiment, a user would be allowed to specify a larger number of web service methods with more detailed criteria than in a Smoke test. According to another embodiment, one or more test cases can be selected together, assigned a name and saved as a single test. The user would be allowed to access the saved test and run it again, consistent with another embodiment. The turnover rate for obtaining results may be increased because the test is already in existence. According to one embodiment, the Regression test provides a detailed view of the functionality and stability of the selected group. Classification of one or more selected test cases as Regression test can be effectuated by selecting the corresponding ones of checkboxes 2130, consistent with one embodiment. Upon selecting a Regression Test button 2140, for example, all the test cases whose corresponding Regression Test checkbox has been checked will undergo a Regression test.

Alternatively, a user can conduct some tests, at will, without classifying any test case as Smoke or Regression. According to one embodiment, this type of testing is accomplished by selecting the corresponding ones of checkboxes 2110 and selecting a Selected Cases button 2160. According to one embodiment, this option provides the user with the flexibility to determine the sequence of one or more web service methods to be tested. For example, the user can set the sequence to be web service method9, followed by web service method5, followed by web service method1, and finally web service method3, and the testing will be conducted in that specified sequence.

Figure 22:
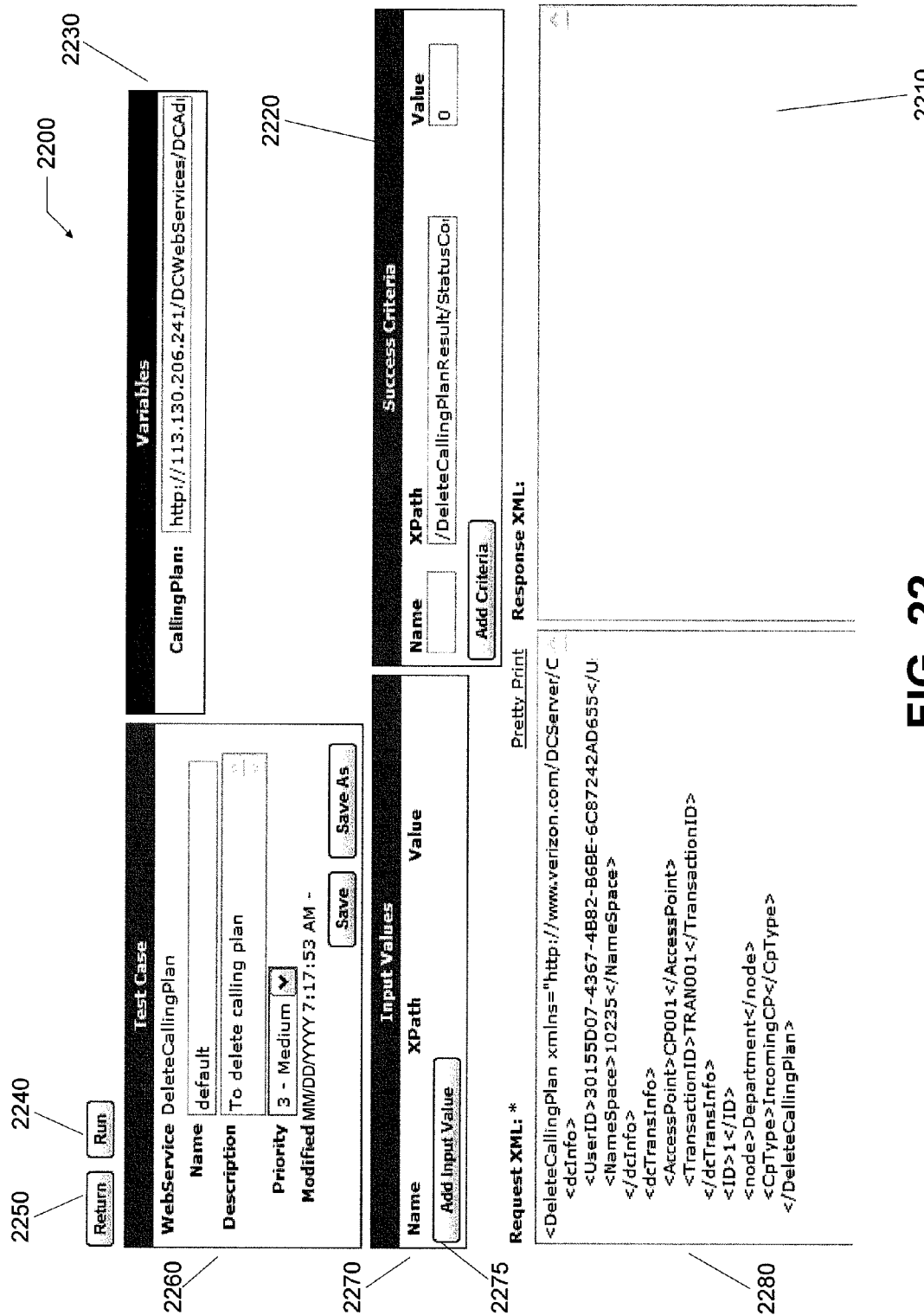
FIG. 22 illustrates an exemplary screen shot of a graphical user interface showing the details of a selected test case according to one embodiment.

FIG. 22 provides an exemplary screen shot 2200 of a GUI generated by a browser launched by one or more of the user machines 110 for providing access to the web services testing tool 120 which displays the details of a selected test case according to one embodiment. As discussed above, one or more test cases can be selected and run as either Smoke Test, Regression Test or Selected Cases. According to one embodiment, a user can decide to view and/or change one or more attributes of a selected test case, and then run the selected test case alone. In order to do so, a user can click on the hyperlinked name of the selected test case which will subsequently bring the user to a detailed test case display page as shown in screen shot 2200, consistent with one embodiment. The screen will display several attributes of the selected test case. According to one embodiment, the user can modify one or more attributes of the selected test case. The user can then execute the selected test case alone, such as by selecting a Run button 2240. Following the execution of a test case, the user can decide to return to a test summary page, shown in for example FIGS. 11 and 21, such as by selecting a Return button 2250. The user can also simply select a Return button 2250 after modifying one or more attributes, without conducting any tests, consistent with one embodiment.

Some of the attributes of a selected test case can be grouped under one section in the GUI, consistent with one embodiment. For example, under Test Case section 2260 of one embodiment, the following attributes can be found: WebService which indicates the name of the web service method under which the selected test case can be found; Name which indicates the name of the selected test case; Description which indicates a narrative for the selected test case; Priority which indicates the priority level assigned to the selected test case; and Modified which indicates the date and time of the last modification of the selected test case. Test Case section 2260 may also include Save and Save As buttons. The functionalities associated with these buttons, according to one embodiment, have already been discussed above. It is noted that the WebService attribute is disabled in this embodiment to prevent the user from modifying the name of the web service method whose associated test case is selected.

Screen shot 2200 also displays Variables section 2230, Input Values section 2270, Success Criteria section 2220, Request XML section 2280, and Response XML section 2210. These sections will be discussed in greater detail below.

Figure 23:
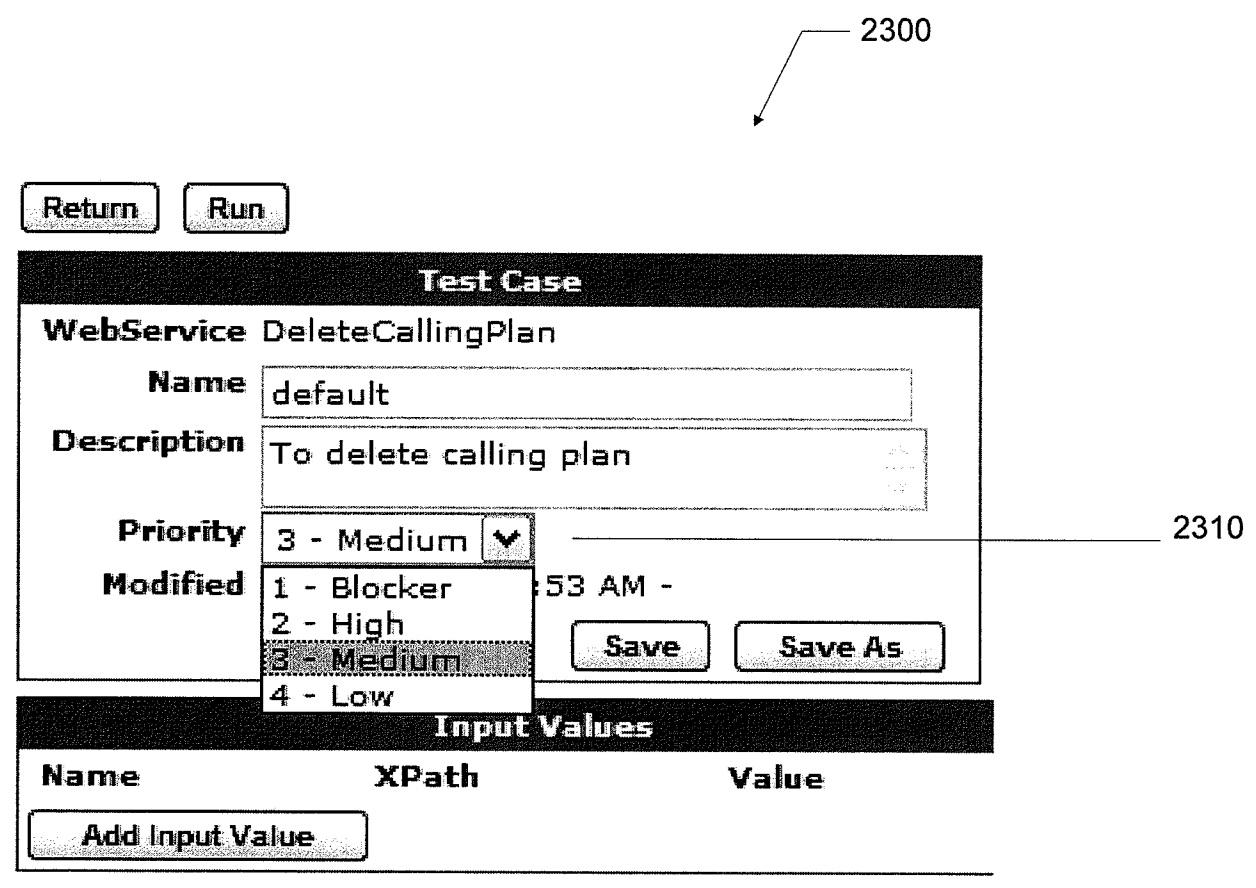

Referring to FIG. 23, an exemplary screen shot 2300 of a GUI generated by a browser launched by one or more of the user machines 110 for providing access to the web services testing tool 120 assigns a priority level to a selected test case according to one embodiment. Screen shot 2300 displays a portion of a detail test case page as shown in FIG. 22 and as at least partially discussed above. A user can assign a priority to a selected test case, such as by means of a drop down menu, consistent with one embodiment. One example of a priority drop down menu 2320 is provided in FIG. 23. According to another embodiment, a user can assign a priority to a selected test case by means of radio buttons. According to one embodiment, a priority level indicates the degree of seriousness associated with a selected test case and consequently, the severity of the potential damage to the application or group whose web service method is being tested in the event of the method's failure of malfunction.

Although the levels of prioritization may vary from implementation to implementation, there are four different levels of priority, namely Blocker, High, Medium, and Low, in descending order of seriousness, in the illustrated embodiment. For example, if a test case assigned the priority level of Blocker fails or does not return a desired result, it will be an indication that the web service method tested is not functioning properly and accordingly, there could possibly be a severe problem with the associated group. Therefore, the issue should be immediately corrected to avoid the failure of the application and the potential dissatisfaction of the application's end user. Conversely, if a test case assigned the priority level of Low fails or does not return a desired result, there will not be a need for the issue to be resolved immediately and the application can continue to perform appropriately to the satisfaction of the application's end user.

Figure 24:
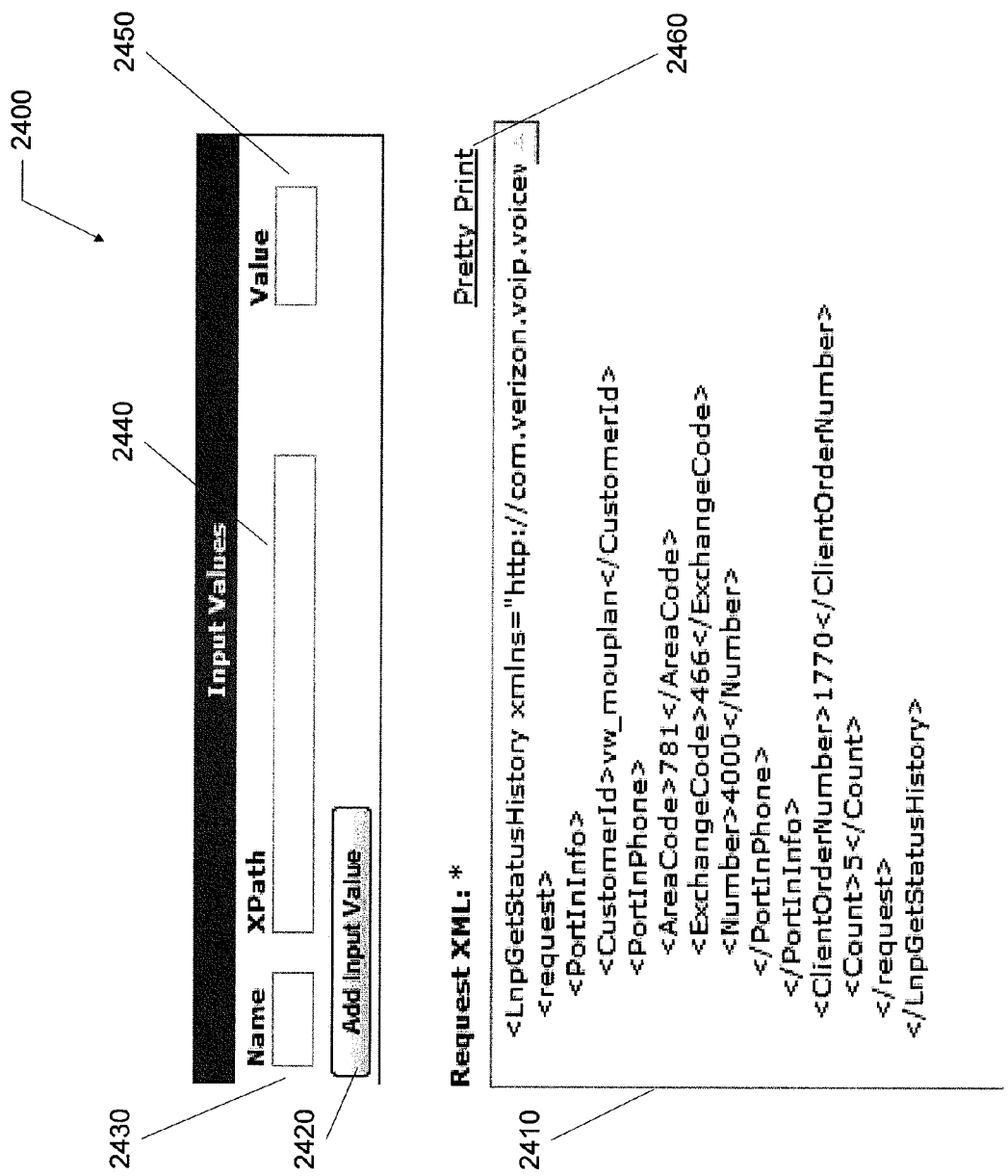
FIG. 24 illustrates an exemplary screen shot of a graphical user interface for adding input values to a desired parameter associated with a selected test case according to one embodiment.

Reference is now made to FIG. 24, which illustrates an exemplary screen shot 2400 of a GUI generated by a browser launched by one or more of the user machines 110 for providing access to the web services testing tool 120 which provides for adding input values to a desired parameter associated with a selected test case according to one embodiment. Screen shot 2400 displays a portion of a detail test case page as shown in FIG. 22. Request XML section 2410 is shown in FIG. 24. According to one embodiment, XML code is a means for defining input for one or more parameters for the selected test case. While XML will be referenced herein by way of example, other types of code, such as HTML or other non-markup languages, could be similarly utilized in other embodiments. According to one embodiment, the XML code is defined in Request XML section 2410, such as based upon user input. After the XML code is defined, it is submitted to the server for processing. The server then returns another XML code as a result, for example in Response XML section 2210 as shown in FIG. 22. The Response XML section will be discussed below. Request XML section 2410 contains the XML code associated with a selected test case. According to one embodiment, each test case has an associated Request XML section. For an average user, XML can be a complicated scripted language to read, understand, use, and modify. It can give the appearance of a large unmanageable amount of text to the user and accordingly, the user may not know which necessary parameter or which desired parameter to modify for a selected test case. Therefore, in order to make the modification of parameters in test cases and the submission of input to a selected test case more user friendly, a Add Input Value functionality is provided.

With this functionality, input values can be added to one or more desired parameters of a selected test case. If these values are present, they will override the values associated to the one or more parameters in Request XML section 2410 at the runtime of the test case. To add an input value, the user can click on a Add Input Value button 2275 from an original screen as shown in screen shot 2200 of FIG. 22 under Input Value section 2270, and will then be presented with three text boxes, namely Name text box 2430, XPath text box 2440, and Value text box 2450, as shown in screen shot 2400 of FIG. 24. The user can then add the name of the parameter, the XPath of the parameter, and the value to be associated with the parameter. In accordance with one embodiment, the XPath of the parameter specifies a path inside the XML code to the part or parts wherein the parameter is located, i.e., the element(s) of the XML code referred to by the user. The user can then save the changes, such as by selecting a Save button. This process can be repeated multiple times as desired by the user to add values to various parameters in the test case. According to one embodiment, one instance of the parameter will be substituted. The value specified would be any value the user would like the parameter to hold at runtime of the test case. According to another embodiment, multiple instances of the parameter will be replaced in the Request XML section.

For example, if a user would like to substitute the value for the parameter named AreaCode, as shown in screen shot 2400, the user would submit AreaCode in Name text box 2430, /request/PortInInfo/PortInPhone/AreaCode in XPath text box 2440, and any value the user would like the parameter AreaCode to hold at runtime in Value text box 2450. Similarly, if a user would like to substitute the value for the parameter named CustomerId, as shown in screen shot 2400, the user would submit CustomerId in Name text box 2430, /request/PortInInfo/PortInPhone/CustomerId in XPath text box 2440, and any value the user would like the parameter CustomerId to hold at runtime in Value text box 2450. If the whole Request XML section is considered as a tree structure, the XPath value should lead to the correct branch that has the desired node, i.e., the parameter whose value or values to override at runtime. Multiple input values can be added as long as they match with the Request XML parameter list associated with the selected test case.

In accordance with one embodiment, a formatting tool, such as a Pretty Print feature, may be provided for the XML code contained in Response XML section 2410. This feature allows the user to align the XML code in Response XML to a proper structure by making proper indentation. This formatting tool may be particularly useful to format the XML after it has been copied from an external location and pasted in the Response XML section, according to one embodiment. It can also be used when the indentation of the XML code has been changed inadvertently by the user or as a result of the execution of function. This feature can be a hyperlink, consistent with one embodiment, as exemplified by Pretty Print link 2460. According to another embodiment, the formatting tool can be represented by a button. This formatting feature can be used by simply clicking on the appropriate link 2460 or button, consistent with one embodiment.

Figure 25:
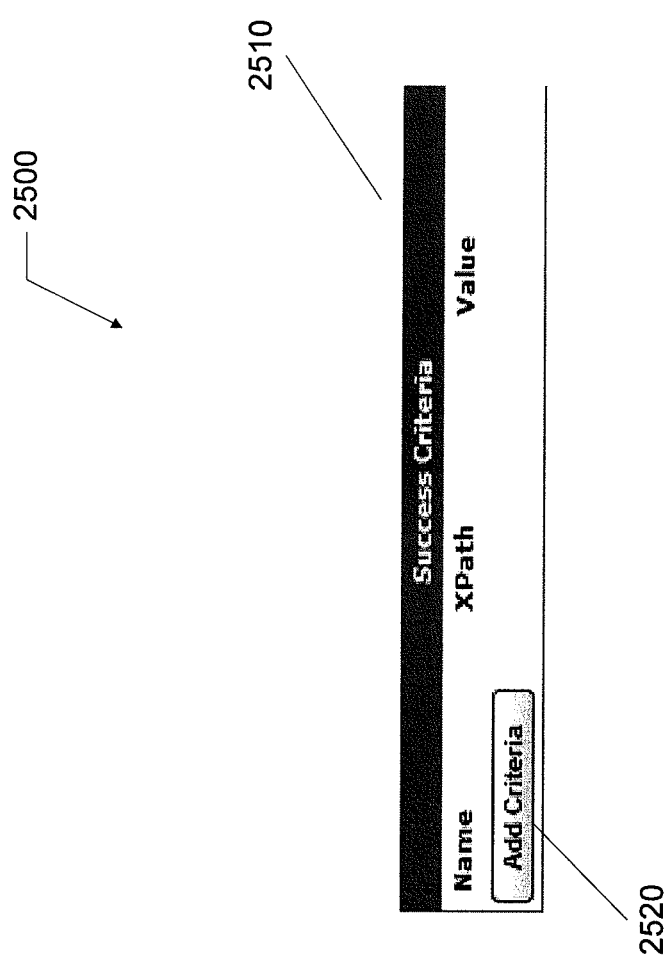
FIG. 25 illustrates an exemplary screen shot of a graphical user interface for adding criteria to a selected test case according to one embodiment.

In FIG. 25, an exemplary screen shot 2500 of a GUI generated by a browser launched by one or more of the user machines 110 for providing access to the web services testing tool 120 provides for adding criteria to a selected test case, according to one embodiment Screen shot 2500 displays a portion of a detail test case page as shown in FIG. 25. According to one embodiment, criteria can be added to a test case based on which the user can derive the test result of the test case. The criteria added can be one of success or failure, consistent with one embodiment. Therefore, in accordance with one embodiment, success criteria can be expected values to be returned after the test case is executed, whereas failure criteria can be values not expected to be returned. The test result can be interpreted as pass or fail, consistent with another embodiment. According to one embodiment, a user can specify the success criteria for a selected test case and run the test case. If the result(s) observed by the user is equal to or the same as the expected success criteria which was submitted, the test would have passed and the web service method test would be considered operational. However, if the result(s) observed by the user is not equal to or is different from the expected success criteria, it would be an indication that the test failed and that there is an issue that needs to be resolved with the tested web service method.

The process for adding criteria to a test case is similar to that of adding an input value to a test case. The difference is that, in the process for adding an input value, the values submitted for the parameters are substituted as appropriate in Request XML code whereas, here in the process for adding criteria, the value of the parameters in Response XML code is validated against the corresponding parameter values defined in Add Criteria to derive a test result. To add criteria, the user of one embodiment can select an Add Criteria button 2520 under Success Criteria section 2510 as shown FIG. 25. The user will then be presented with text boxes similar to those shown in FIG. 24, namely Name, XPath, and Value, consistent with one embodiment. The user can subsequently add the appropriate values in the appropriate text boxes and select the Run button, for example, as shown in FIG. 22.

Figure 26:
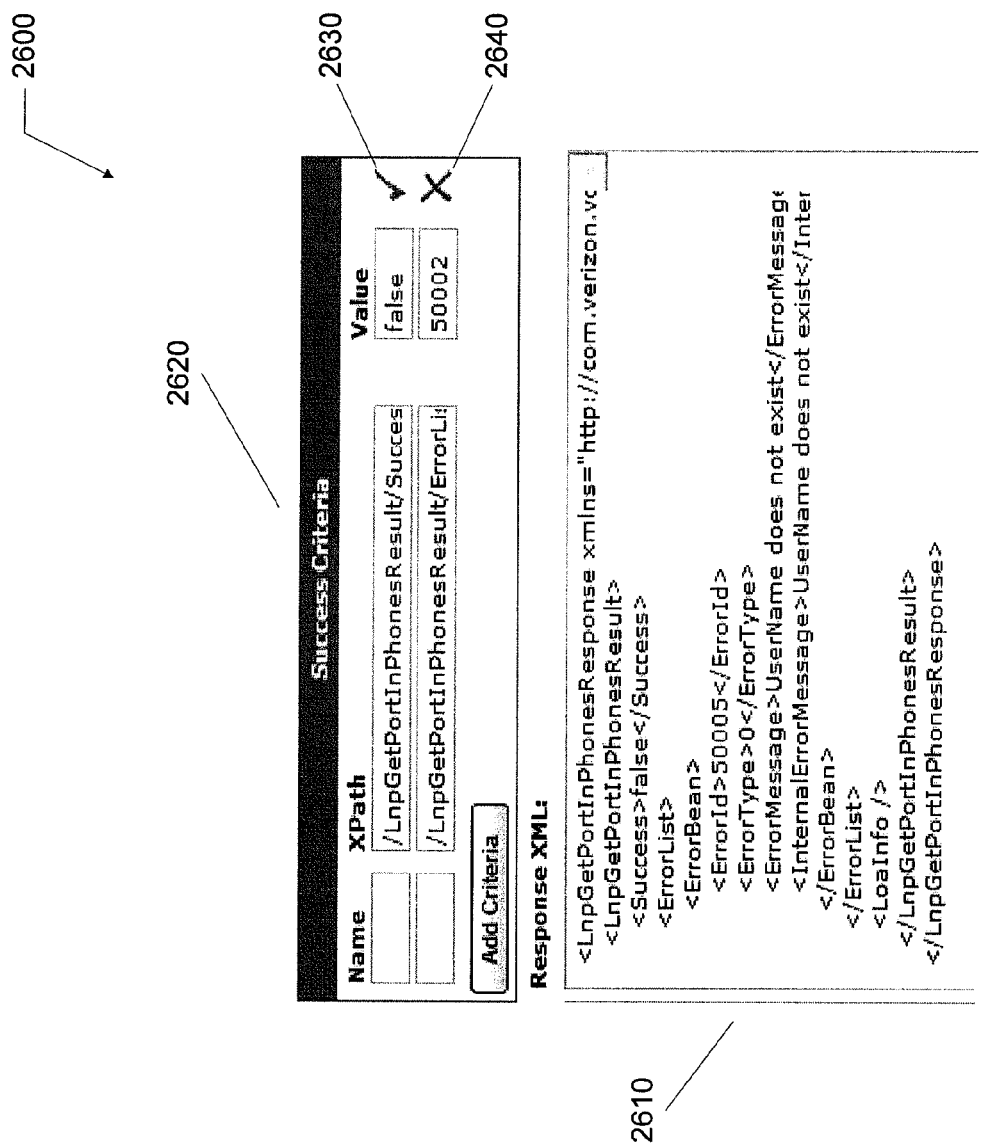
FIG. 26 illustrates an exemplary screen shot of a graphical user interface after a success criteria has been added to a selected test case and the selected test case has been executed according to one embodiment.

FIG. 26 provides an exemplary screen shot 2600 of a GUI generated by a browser launched by one or more of the user machines 110 for providing access to the web services testing tool 120 following the addition of success criteria to a selected test case and following execution of the selected test case according to one embodiment. Screen shot 2600 displays a Response XML section 2610. As discussed above, XML code is defined in Request XML, submitted to the server for processing, and is then returned as a result in the form of another XML code contained, for example, in Response XML section 2610. According to one embodiment, each parameter contains the value returned by the server after processing. The testing tool will compare the values submitted as success criteria with the corresponding values returned by the server after processing and provide an indication to the user as to the success or failure of the selected test case, consistent with one embodiment.

Success Criteria section 2620 is also provided in FIG. 26. According to one embodiment, Success Criteria section provides one ore more parameters whose success criteria have been defined, each with a corresponding Name, XPath, and Value text boxes. According to another embodiment, each parameter may be associated with a ✓ mark or a ✗ mark. The ✓ mark corresponds to a match between the success criteria of the parameter and the returned value thereby indicating a pass, consistent with one embodiment. Conversely, the ✗ mark corresponds to a discrepancy between the success criteria of the parameter and the returned value thereby indicating a failure.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
   providing, by a processor of a first device, a user interface to a second device that is located remotely from the first device,
      the user interface providing information identifying one or more applications to be tested by the first device,
      the one or more applications being included in one or more third devices located remotely from the first device and the second device;
   detecting, by the processor and via the user interface, selection of information identifying an application from the information identifying the one or more applications,
      the information identifying the application being selected by the second device;
   presenting, by the processor and via the user interface, information identifying one or more features that are associated with the selected application, based on detecting the selection of the information identifying the application;
   detecting, by the processor and via the user interface, selection of information identifying a feature from the information identifying the one or more features,
      the information identifying the feature being selected by the second device;
   detecting, by the processor and via the user interface, selection of information identifying a function from one or more functions that are associated with the selected feature,
      the information identifying the function being selected by the second device;
   detecting, by the processor and via the user interface, selection of information identifying at least one test case from one or more test cases that are associated with the selected function,
      the information identifying the at least one test case being selected by the second device; and
   automatically conducting, by the processor, the selected at least one test case to determine whether the selected application is operational.

2. The method of claim 1, further comprising:
   receiving, via the user interface, at least one of:
      information identifying at least one other function to be associated with the selected feature,
      information identifying at least one other feature to be associated with the selected application, or
      information identifying at least one other test case to be associated with the selected function;
   associating the at least one other function with the selected feature when the information identifying the at least one other function is received;
   associating the at least one other feature with the selected application when the information identifying the at least one other feature is received; and
   associating the at least one other test case with the selected function when the information identifying the at least one other test case is received.

3. The method of claim 1, comprises:
where detecting selection of the information identifying the at least one test case includes:
detecting selection, by the second device, of information identifying a first test case and a second test case from the one or more test cases,
where the first test case is different than the second test case, the method further comprising:
conducting the first test case and the second test case to determine whether the selected function is operational; and
providing results of conducting the first test case and the second test case to the second device,
the results indicating whether the selected application is operational.

4. The method of claim 1, further comprising:
automatically generating information identifying the one or more functions associated with the selected feature based on detecting the selection of the information identifying the feature;
detecting selection of information identifying another function of the one or more functions;
detecting selection of information identifying another test case from a plurality of test cases that are associated with the selected other function; and
conducting the other test case, selected from the plurality of test cases that are associated with the selected other function, to determine whether the selected other function is operational.

5. The method of claim 1, where detecting selection of the information identifying the at least one test case comprises:
receiving information identifying at least one attribute to be associated with the selected at least one test case,
where automatically conducting the selected at least one test case includes conducting the selected at least one test case based on the at least one attribute, and
where the at least one attribute includes at least one of:
information identifying a test case priority associated with the selected at least one test case,
information identifying a test case classification associated with the selected at least one test case,
information identifying success criteria associated with the selected at least one test case,
information identifying a test case parameter value associated with the selected at least one test case,
information identifying a test sequence associated with the selected at least one test case, or
information identifying a network location associated with the selected function associated with the selected at least one test case.

6. The method of claim 1, further comprising:
storing information associated with the selected at least one test case;
generating another test case associated with the selected function based on the stored information associated with the at least one test case; and
conducting the other test case to determine whether the selected function is operational.

7. The method of claim 1, further comprising receiving a modification to at least of one:
the information identifying the one or more applications,
the information identifying the one or more features, or
information identifying the one or more test cases,
where receiving the modification includes at least one of:
adding information identifying at least one of another application, another feature, or another test case,
deleting at least one of the information identifying the one or more applications, the information identifying the one or more features, or the information identifying the one or more test cases, or
updating at least one of the information identifying the one or more applications, the information identifying the one or more features, or the information identifying the one or more functions.

8. A device comprising:
a processor to:
provide a user interface to a second device that is located remotely from the device;
present, via the user interface, information identifying one or more applications, included in one or more third devices, to be tested by the device,
the one or more third devices being located remotely from the device and the second device;
detect, via the user interface, selection, by the second device, of information identifying an application from the information identifying the one or more applications;
present, via the user interface and based on the selected application, information identifying one or more features that are associated with the selected application;
detect, via the user interface, selection, by the second device, of information identifying a feature from the information identifying the one or more features;
present, via the user interface and based on the selected feature, information identifying one or more functions that are associated with the selected feature;
detect, via the user interface, selection, by the second device, of information identifying a function from the information identifying the one or more functions that are associated with the selected feature;
detect, via the user interface, selection, by the second device, of information identifying at least one test case from one or more test cases that are associated with the selected function;
conduct the selected at least one test case to determine whether the selected application is operational;
determine that the selected function is not operational and that the selected application is operational when the selected at least one test case fails and a priority, associated with the selected at least one test case, corresponds to a first priority;
determine that the selected function and the selected application are not operational when the selected at least one test case fails and the priority corresponding to a second priority,
the second priority being different than the first priority, and
present, to the second device and via the user interface, one or more results of conducting the selected at least one test case.

9. The device of claim 8, where the processor is to:
receive from the second device:
information identifying at least one other feature to be associated with the selected application, and
information identifying at least one other function to be associated with the selected feature;
associate the at least one other function with the selected feature;
associate the at least one other feature with the selected application;

conduct, after associating the at least one other function with the selected feature, one or more other test cases to determine whether the at least one other function is operational; and conduct, after associating the at least one other feature with the selected application, at least one other test case to determine whether the at least one other feature is operational.

10. The device of claim 8, where the processor is further to:
provide, to the second device via the user interface, remote access to the device to test the one or more applications;

detect selection, by the second device, of information identifying another function from the one or more functions, detect selection, by the second device, of information identifying a plurality of test cases that are associated with the other function; and conduct the plurality of test cases to determine whether the other function is operational.

11. The device of claim 8, where the processor is further to:
generate the information identifying the one or more features associated with the selected application based on detecting the selection of the information identifying the application;

detect selection of information identifying another feature of the one or more features;

detect selection of information identifying another function associated with the selected other feature;

conduct one or more test cases associated with the selected other function that is associated with the selected other feature; and determine whether the selected other function, that is associated with the selected other feature, is operational based on conducting the one or more test cases.

12. The device of claim 8, where the selected application includes a web application, and
where the processor is further to receive, from the second device, a modification of at least one attribute associated with the selected at least one test case,
where the at least one attribute includes:
information identifying success criteria,
information identifying a test case priority, and
information identifying an address, in a network, associated with the selected feature, and
where the processor is further to:
conduct, after the modification of the at least one attribute, the selected at least one test case based on the information identifying the address associated with the selected feature,
receive, from a particular third device of the one or more third devices, particular results of conducting the selected at least one test case after the modification of the at least one attribute,
the application being associated with the particular third device,
determine that the selected function is operational when the particular results match the success criteria, and
when the particular results do not match the success criteria,
determine that the selected function is not operational,
determine that an issue, relating to the selected function being not operational, is to be corrected within a first period of time when the test case priority corresponds to a first priority, and
determine that the issue, relating to the selected function being not operational, is to be corrected within a second period of time when the test case priority corresponds to a second priority that is lower than the first priority,
the second period of time being longer than the first period of time.

13. The device of claim 8, further comprising a memory to store information associated with the at least one test case and information associated with another test case that is associated with a second feature of the one or more features,
where the processor is further to:
retrieve the information associated with the selected at least one test case and the information associated with the other test case; and
conduct the at least one test case with the other test case.

14. The device of claim 8, where the processor is further to:
receive a modification of information associated with the selected function, and
conduct at least one of the selected test case or another test case, of the one or more test cases, based on the modification of the information associated with the selected function.

15. A non-transitory computer-readable medium storing instructions, the instructions comprising:
one or more instructions which, when executed by at least one processor of a first device, cause the at least one processor to detect selection, by a second device, of information identifying a web application to be tested by the first device,
the first device being located remotely from the second device, and
the web application being provided by a third device that is located remotely from the first device and the second device;
one or more instructions which, when executed by the at least one processor, cause the at least one processor to present, to the second device, information identifying a plurality of features that are associated with the selected web application, based on detecting the selection of the web application;
one or more instructions which, when executed by the at least one processor, cause the at least one processor to detect selection, by the second device, of information identifying a feature from the information identifying the plurality of features;
one or more instructions which, when executed by the at least one processor, cause the at least one processor to detect selection, by the second device, of information identifying a function from a plurality of functions that are associated with the selected feature;
one or more instructions which, when executed by the at least one processor, cause the at least one processor to detect selection, by the second device, of information identifying at least one test case from a plurality of test cases that are associated with the selected function; and
one or more instructions which, when executed by the at least one processor, cause the at least one processor to conduct the selected at least one test case to determine whether the selected web application is operational.

16. The non-transitory computer-readable medium of claim 15,
the instructions further comprising:
one or more instructions to provide a user interface that provides, to the second device, remote access to the first device to cause the first device to test the selected web application,
where the information identifying the web application, the information identifying the feature, the information identifying the function, and the information identifying the at least one test case are selected via the user interface.

17. The non-transitory computer-readable medium of claim 15, the instructions further comprising:
    one or more instructions to generate the one or more test cases associated with the selected function based on detecting the selection of the information identifying the function;
    one or more instructions to detect selection of information identifying a first test type,
        where the at least one test case is conducted based on the first test type;
    one or more instructions to detect selection of information identifying a second test type that is different than the first test type; and
    one or more instructions to conduct the at least one test case based on the second test type,
        where the second test type corresponds to a test case that is more specific than a test case corresponding to the first test type.

18. The non-transitory computer-readable medium of claim 15, the instructions further comprising:
    one or more instructions to receive, from the second device, information identifying a priority associated with the selected at least one test case;
    one or more instructions to determine that the selected function is not operational and that the selected application is operational when the selected at least one test case fails and when the priority corresponds to a first priority;
    one or more instructions to receive, from the second device, a modification of the priority from the first priority to a second priority that is different than the first priority;
    one or more instructions to conduct the selected at least one test case after receiving the modification; and
    one or more instructions to determine that the selected function and the selected application are not operational when the selected at least one test case fails and when the priority corresponds to the second priority.

19. The non-transitory computer-readable medium of claim 15, the instructions further comprising:
    one or more instructions to store information associated with the selected at least one test case and information associated with another test case of the one or more test cases;
    one or more instructions to receive, from the second device, information identifying a sequence for conducting the at least one test case and the other test case; and
    one or more instructions to conduct the at least one test case and the other test case based on the sequence.

20. The non-transitory computer-readable medium of claim 15, the instructions further comprising:
    one or more instructions to update information associated with the one or more test cases; and
    one or more instructions to conduct the one or more test cases based on the updated information.

* * * * *